(12) United States Patent
Chiou et al.

(10) Patent No.: US 10,908,979 B2
(45) Date of Patent: *Feb. 2, 2021

(54) PARTIALLY RECONFIGURING ACCELERATION COMPONENTS

(71) Applicant: Microsoft Technology Licensing, LLC, Redmond, WA (US)

(72) Inventors: Derek T. Chiou, Austin, TX (US); Sitaram V. Lanka, Mercer Island, WA (US); Adrian M. Caulfield, Woodinville, WA (US); Andrew R. Putnam, Seattle, WA (US); Douglas C. Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,181

(22) Filed: Jan. 25, 2019

(65) Prior Publication Data

US 2019/0155669 A1  May 23, 2019

Related U.S. Application Data

(63) Continuation of application No. 14/752,785, filed on Jun. 26, 2015, now Pat. No. 10,216,555.

(51) Int. Cl.
*A61B 5/00* (2006.01)
*A61B 5/145* (2006.01)
(Continued)

(52) U.S. Cl.
CPC ............. *G06F 11/00* (2013.01); *G06F 8/656* (2018.02); *G06F 11/0709* (2013.01);
(Continued)

(58) Field of Classification Search
CPC ............. H04L 41/509; H04L 41/0813; H04L 41/0869; H04L 41/12; H04L 41/50;
(Continued)

(56) References Cited

U.S. PATENT DOCUMENTS 5,802,290 A  9/1998  Casselman
5,931,959 A  8/1999  Kwiat
(Continued)

FOREIGN PATENT DOCUMENTS

CN  1890998 A  1/2007
CN  101794222 A  8/2010
(Continued)

OTHER PUBLICATIONS

Tumeo et al., A reconfigurable multiprocessor architecture for a reliable face recognition implementation, 4 pages. (Year: 2010).*
(Continued)

*Primary Examiner* — Thuy Dao
(74) *Attorney, Agent, or Firm* — Ranjeev Singh; Singh Law, PLLC

(57) ABSTRACT

Aspects extend to methods, systems, and computer program products for partially reconfiguring acceleration components. Partial reconfiguration can be implemented for any of a variety of reasons, including to address an error in functionality at the acceleration component or to update functionality at the acceleration component. During partial reconfiguration, connectivity can be maintained for any other functionality at the acceleration component untouched by the partial reconfiguration. Partial reconfiguration is more efficient to deploy than full reconfiguration of an acceleration component.

20 Claims, 18 Drawing Sheets

(51) Int. Cl.
*H04N 7/173* (2011.01)
*H04L 29/08* (2006.01)
*G06F 11/14* (2006.01)
*G06F 11/00* (2006.01)
*G06F 11/30* (2006.01)
*G06F 11/07* (2006.01)
*G06F 8/656* (2018.01)

(52) U.S. Cl.
CPC ...... *G06F 11/0793* (2013.01); *G06F 11/1428* (2013.01); *G06F 11/3003* (2013.01)

(58) Field of Classification Search
CPC ............ G06F 17/5022; G06F 17/5027; G06F 1/3203; G06F 1/3209; G06F 1/3221; G06F 11/00; G06F 11/0709; G06F 11/0793; G06F 11/1428; G06F 11/3003; G06F 16/954; G06F 8/656; Y02D 10/154; H04W 76/19; H04W 76/27; H04W 76/30; H04W 76/38; A61B 5/0002; A61B 5/0004; A61B 5/0015; A61B 5/0022; A61B 5/02; H04N 21/41407; H04N 21/4532; H04N 21/422; H04N 21/4316
See application file for complete search history.

(56) References Cited

U.S. PATENT DOCUMENTS

| | | | |
|---|---|---|---|
| 6,415,384 | B1 | 7/2002 | Dave |
| 6,754,881 | B2 | 6/2004 | Kuhlmann et al. |
| 7,218,137 | B2 | 5/2007 | Vadi et al. |
| 7,444,454 | B2 | 10/2008 | Yancey et al. |
| 7,533,256 | B2 | 5/2009 | Walter et al. |
| 7,584,345 | B2 | 9/2009 | Doering et al. |
| 7,809,982 | B2 | 10/2010 | Rapp et al. |
| 8,397,054 | B2 | 3/2013 | Kusmanoff et al. |
| 8,713,574 | B2 | 4/2014 | Creamer et al. |
| 8,943,352 | B1 | 1/2015 | Warneke |
| 9,294,097 | B1 | 3/2016 | Vassiliev |
| 9,612,900 | B2 * | 4/2017 | Anderson ........... G06F 11/0793 |
| 9,983,938 | B2 * | 5/2018 | Heil ....................... G06F 9/5027 |
| 2004/0267920 | A1 | 12/2004 | Hydrie et al. |
| 2007/0038560 | A1 * | 2/2007 | Ansley ................... G06Q 20/10 705/39 |
| 2009/0102838 | A1 | 4/2009 | Bullard et al. |
| 2009/0187756 | A1 | 7/2009 | Nollet et al. |
| 2009/0287628 | A1 | 11/2009 | Indeck et al. |
| 2010/0262882 | A1 | 10/2010 | Krishnamurthy |
| 2012/0054770 | A1 | 3/2012 | Krishnamurthy et al. |
| 2012/0151476 | A1 * | 6/2012 | Vincent ............... G06F 9/45558 718/1 |
| 2013/0249947 | A1 | 9/2013 | Reitan |
| 2014/0108481 | A1 | 4/2014 | Davis et al. |
| 2014/0140225 | A1 * | 5/2014 | Wala ..................... H04W 24/06 370/252 |
| 2014/0282056 | A1 | 9/2014 | Godsey |
| 2015/0379099 | A1 * | 12/2015 | Vermeulen .............. G06F 16/27 707/634 |
| 2019/0007263 | A1 * | 1/2019 | Lahiri ................. H04L 41/0803 |
| 2019/0190847 | A1 | 6/2019 | Douglas et al. |

FOREIGN PATENT DOCUMENTS

| | | |
|---|---|---|
| CN | 101802789 A | 8/2010 |
| CN | 102023932 A | 4/2011 |
| CN | 102024048 A | 4/2011 |
| CN | 102117197 A | 7/2011 |
| CN | 102282542 A | 12/2011 |
| CN | 102662628 A | 9/2012 |
| CN | 103034295 A | 4/2013 |
| CN | 103034536 A | 4/2013 |
| CN | 103238305 A | 8/2013 |
| CN | 103270492 A | 8/2013 |
| CN | 103493009 A | 1/2014 |
| CN | 103645950 A | 3/2014 |
| CN | 104038570 A | 9/2014 |
| CN | 104040491 A | 9/2014 |
| CN | 104239088 A | 12/2014 |
| CN | 104699508 A | 6/2015 |
| CN | 105824706 A | 8/2016 |
| CN | 107426138 A | 12/2017 |
| WO | 2013049079 A3 | 5/2013 |
| WO | 2014088967 A1 | 6/2014 |
| WO | 2014094821 A1 | 6/2014 |

OTHER PUBLICATIONS

"Final Office Action Issued in U.S. Appl. No. 15/669,652", dated Aug. 21, 2019, 25 Pages.

Knodel, et al., "Integration of a Highly Scalable, Multi-FPGA-Based Hardware Accelerator in Common Cluster Infrastructures", In Proceedings of 42nd International Conference on Parallel Processing, Oct. 1, 2013, pp. 893-900.

"Summons to Attend Oral Proceedings Issued in European Patent Application No. 16719599.9", Mailed Date: Jun. 3, 2019, 6 Pages.

"Summons to Attend Oral Proceedings Issued in European Patent Application No. 16719605.4", Mailed Date: May 31, 2019, 6 Pages.

"Extended Search Report Received for European Patent Application No. 11834944.8", dated Jun. 12, 2019, 13 Pages.

"Non Final Office Action Issued in U.S. Appl. No. 15/669,652", dated Apr. 2, 2019, 20 Pages.

"Non Final Office Action Issued in U.S. Appl. No. 15/669,652", dated Mar. 3, 2020, 31 Pages.

Kwok, et al., "On the Design of a Self-Reconfigurable SoPC Cryptographic Engine", In Proceedings of the 24th International Conference on Distributed Computing Systems Worksho, Mar. 23, 2004.

"Advisory Action Issued in U.S. Appl. No. 15/669,652", dated Nov. 20, 2019, 5 Pages.

"Notice of Allowance Issued in U.S. Appl. No. 16/283,878", dated Dec. 12, 2019, 8 Pages.

"First Office Action Issued in Chinese Patent Application No. 201680022186.8", dated Mar. 3, 2020, 6 Pages. (Without English Translation).

"First Office Action Issued in Chinese Patent Application No. 201680022187.2", dated Mar. 5, 2020, 5 Pages. (Without English Translation).

"First Office Action Issued in Chinese Patent Application No. 201680022447.6", dated Feb. 25, 2020, 7 Pages. (Without English Translation).

"First Office Action Issued in Chinese Patent Application No. 201680022845.8", dated Mar. 26, 2020, 10 Pages. (Without English Translation).

"First Office Action and Search Report Issued in Chinese Patent Application No. 201680022171.1", dated Apr. 22, 2020, 8 Pages.

"First Office Action and Search Report Issued in Chinese Patent Application No. 201680021987.2", dated Apr. 14, 2020, 28 Pages.

"Non-Final Office Action Issued in U.S. Appl. No. 16/100,110", dated May 12, 2020, 24 Pages.

"Non Final Office Action Issued in U.S. Appl. No. 16/128,224", dated Jun. 17, 2020, 21 Pages.

Charitopoulos, et al., "Hardware Task Scheduling for Partially Reconfigurable FPGAs", In International Symposium on Applied Reconfigurable Computing, Mar. 31, 2015, pp. 487-498.

"First Office Action and Search Report Issued in Chinese Patent Application No. 201680037389.4", dated May 28, 2020, 11 Pages.

"Notice of Allowance Issued in U.S. Patent Application No. 201680022845.8", dated Jun. 23, 2020, 5 Pages.

"First Office Action and Search Report Issued in Chinese Patent Application No. 201680037768.3", dated Jun. 17, 2020, 8 Pages.

"Final Office Action Issued in U.S. Appl. No. 15/669,652", dated Jul. 22, 2020, 27 Pages.

Cilardo, et al., "Automated Synthesis of FPGA-based Heterogeneous Interconnect Topologies", In Proceedings of International Conference on Field programmable Logic and Applications, Sep. 4, 2013, 8 Pages.

(56) References Cited

OTHER PUBLICATIONS

Fox, et al., "Reliably Prototyping Large SoCs Using FPGA Clusters", In Proceedings of 9th International Symposium on Reconfigurable and Communication-Centric Systems-on-Chip, May 26, 2014, 8 pages.

"Second Office Action Issued in Chinese Patent Application No. 201680022447.6", dated Aug. 28, 2020, 10 Pages.

Office Action Issued in European Patent Application No. 16719600.5, dated Oct. 16, 2020, 9 Pages.

"Office Action Issued in European Patent Application No. 16719601.3", dated Oct. 30, 2020, 8 Pages.

"Final Office Action Issued in U.S. Appl. No. 16/100,110", dated Nov. 4, 2020, 30 Pages.

* cited by examiner

PARTIALLY RECONFIGURING ACCELERATION COMPONENTS

CROSS-REFERENCE TO RELATED APPLICATIONS

This application is a continuation of U.S. patent application Ser. No. 14/752,785, entitled "Partially Reconfiguring Acceleration Components," filed on Jun. 26, 2015, the disclosure of which is incorporated herein in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

BRIEF SUMMARY

Examples extend to methods, systems, and computer program products for partially reconfiguring acceleration components. A reason for changing the provided functionality of an acceleration component is detected (e.g., an error at the acceleration component or an available update to the provided functionality). The provided functionality at the acceleration component is halted. The acceleration component is partially reconfigured by writing an image for the provided functionality to the acceleration component (e.g., to address an error or update the provided functionality). Other functionality at the acceleration component is maintained as operational during partially reconfiguring the acceleration component. The provided functionality is activated at the acceleration component after partially reconfiguring the acceleration component is complete.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1:
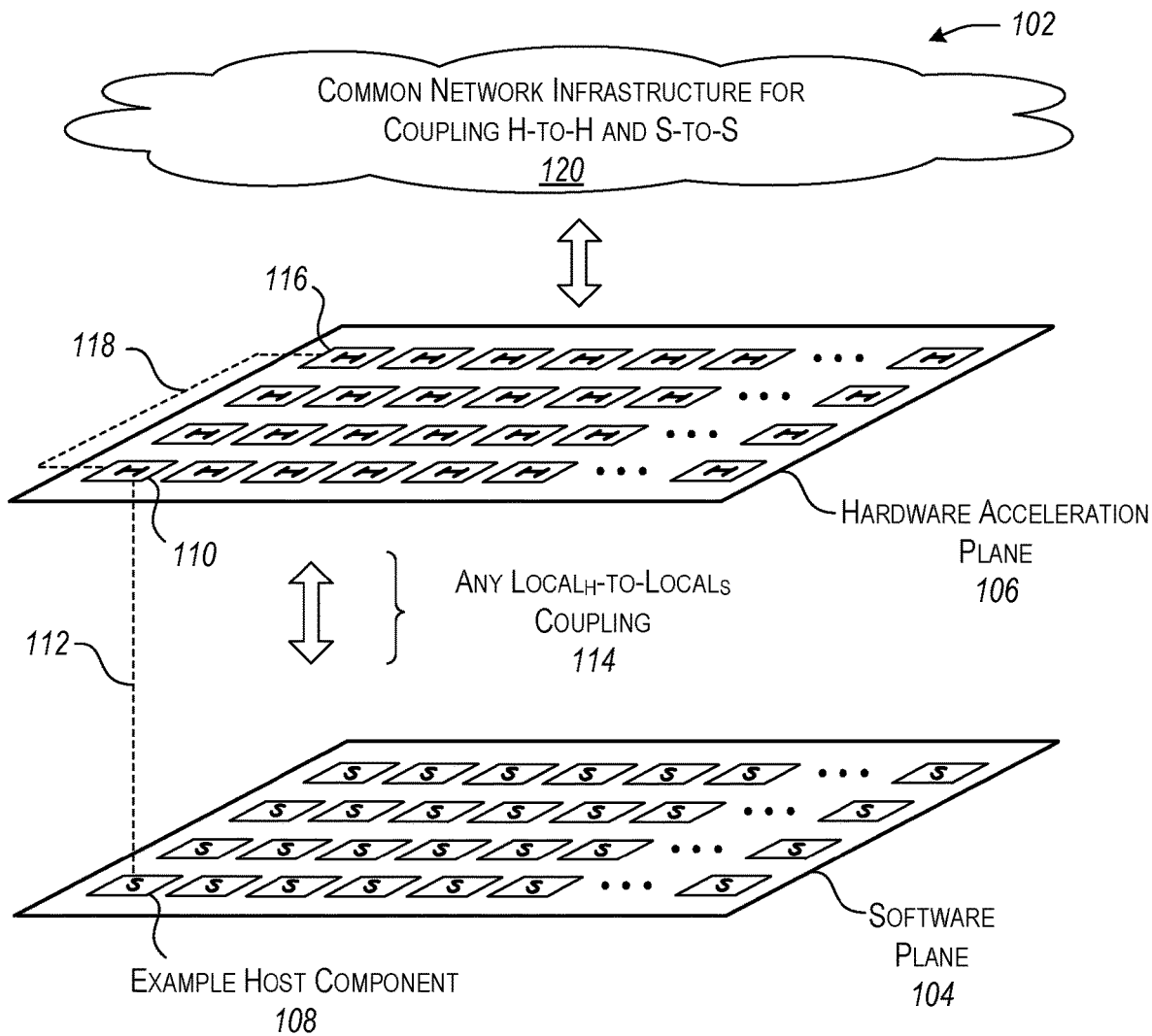
FIG. 1 illustrates an example architecture that includes a software plane and a hardware acceleration plane.

Examples extend to methods, systems, and computer program products for partially reconfiguring acceleration components. A reason for changing the provided functionality of an acceleration component is detected (e.g., an error at the acceleration component or an available update to the provided functionality). The provided functionality at the acceleration component is halted. The acceleration component is partially reconfigured by writing an image for the provided functionality to the acceleration component (e.g., to address an error or update the provided functionality). Other functionality at the acceleration component is maintained as operational during partially reconfiguring the acceleration component. The provided functionality is activated at the acceleration component after partially reconfiguring the acceleration component is complete.

In one aspect, an acceleration component (e.g., a hardware accelerator, such as, a Field Programmable Gate Array (FPGA)) provides functionality to a group of interoperating acceleration components that provide acceleration for a service. Functionality at each acceleration component in the group of interoperating acceleration components is composed together in a graph to provide the service acceleration. The acceleration component has other functionality in addition to the provided functionality. The group of interoperating acceleration components and one or more other acceleration components are part of a hardware acceleration plane that includes a larger plurality of acceleration components providing a configurable fabric of acceleration components for accelerating services.

Implementations may comprise or utilize a special purpose or general-purpose computer including computer hardware, such as, for example, one or more processors and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multi-processor systems, microprocessor-based or programmable consumer electronics, network PCs, minicomputers, mainframe computers, mobile telephones, PDAs, tablets, pagers, watches, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and the following claims, an "acceleration component" is defined as a hardware component specialized (e.g., configured, possibly through programming) to perform a computing function more efficiently than software running on general-purpose central processing unit (CPU) could perform the computing function. Acceleration components include Field Programmable Gate Arrays (FPGAs), Graphics Processing Units (GPUs), Application Specific Integrated Circuits (ASICs), Erasable and/or Complex programmable logic devices (PLDs), Programmable Array Logic (PAL) devices, Generic Array Logic (GAL) devices, and massively parallel processor array (MPPA) devices.

In this description and in the following claims, a "role" is defined as functionality provided by an acceleration component to a group of interoperating acceleration components used to accelerate a service. Roles at each acceleration component in a group of interoperating acceleration components can be linked together to compose a graph that provides the service acceleration.

In this description and in the following claims, a "graph" is defined as a group of interconnected (e.g., network connected) acceleration components providing acceleration for a service wherein each acceleration component in the group provides a portion of the acceleration functionality.

In this description an in the following claims, an "image" is defined as a file including information that can be used in configuration of an acceleration component, such as, for example, an FPGA. Information included in an image file can be used to program hardware components of an acceleration component (e.g., logic blocks and reconfigurable interconnects of an FPGA) to implement desired functionality. Desired functionality can be implemented to solve virtually any problem which is computable.

In this description and in the following claims, a "neighbor acceleration component" is defined as an acceleration component configured to exchange input and/or output with another acceleration component when interconnected to the other acceleration component within a graph. Neighbor is viewed logically from the perspective of the graph. The physical proximity of an acceleration component relative to another acceleration component is not a determining factor in identifying neighbor acceleration components. That is, acceleration components that are not physically adjacent to one another (or even near to one another on a network or within a datacenter) can be configured to exchange data with one another when interconnected within a graph. Acceleration components interconnected within a graph can be viewed as neighbor acceleration components even if data exchanged between the acceleration components physically passes through other acceleration components outside of the graph or through host components in transit between the acceleration components. However, acceleration components that are physically adjacent or near to one another on a network or in a datacenter and are interconnected within a graph can also be viewed as neighbor acceleration components with respect to one another.

In general, an acceleration component can include an array of programmable logic blocks and hierarchy of reconfigurable interconnects that allow logic blocks to be connected together in different configurations to provide different functionality (i.e., different roles). Image files can be received and loaded at an acceleration component to configure programmable logic blocks and configure interconnects to provide desired functionality (i.e., roles).

In some environments, applications (services) are provided to a client from a data center. A data center includes multiple (and potentially a very large number of) software-driven general purpose computing devices. Each general purpose computing device can include one or more central processing units (CPUs) that process machine-readable instructions to perform specified computing activities. The multiple general purpose computing devices are networked to one another such that the combined power of the multiple general purpose computer systems (or subsets thereof) can be used to perform more complex computing activities.

Data center providers face continuing challenges to increase processing capabilities and efficiency within and provided by data centers. Continuing to add more and more general purpose computing devices is not feasible due at least in part to power limitations. Computing device specialization is one option. For example, computing devices can be specialized for specific scale workloads to provide some efficiency gains. However, computing device specialization is problematic for at least two reasons. First, lack of homogeneity in a data center increases management issues and provides inconsistent platforms for applications to rely on. Further, data center services evolve rapidly, making non-programmable hardware features impractical. Thus, data center providers need continued improvements in performance and efficiency but cannot obtain those improvements from general purpose computing devices.

Aspects facilitate partially reconfiguring an acceleration component. Partial reconfiguration can be implemented for any of a variety of reasons, including to address an error in functionality at the acceleration component or to update functionality at the acceleration component. During partial reconfiguration, connectivity can be maintained for any other functionality at the acceleration component untouched by the partial reconfiguration. Partial reconfiguration is more efficient to deploy than full reconfiguration of an acceleration component.

In some aspects, an acceleration component provides a role to a group of interoperating acceleration components that provide acceleration of a service. Roles at each acceleration component in the group of interoperating acceleration components are composed together into a graph that provides the service acceleration. The acceleration component can also have other functionality in addition to the role.

For example, in one aspect, an acceleration component provides roles to a plurality of groups of interoperating acceleration components composed together into graphs to provide acceleration for a plurality of corresponding services. During reconfiguration of a role for one group of interoperating acceleration components, roles for any other groups of interoperating acceleration components can be maintained. Various groups of interoperating acceleration components can be part of a hardware acceleration plane that includes a larger plurality of acceleration components. The hardware acceleration plane provides a configurable fabric of acceleration components for accelerating services.

An acceleration component can be programmed to include a network interface. The network interface permits the acceleration component to exchange network traffic with other components, such as, for example, other acceleration components or host components. As such, when one role at an acceleration component is being reconfigured, any other roles at the acceleration component can be maintained as stable and operational. Further, when a role at an acceleration component is being reconfigured, the network interface can be maintained as stable and operational. Thus, during reconfiguration of one role at acceleration component, any of the other roles at the acceleration component can continue to use the network interface to route network traffic between the acceleration component and other components.

Any number of different components might detect a reason for changing the provided functionality at an acceleration component. In one aspect, a higher level service monitors a hardware acceleration plane for roles exhibiting incorrect behavior or roles for which an update is available. When an incorrect behavior is detected or an update is available, the higher level service can initiate reconfiguration of a role at an acceleration component to address the error or update the role. In another aspect, a local monitor at an acceleration component monitors the acceleration component for roles exhibiting incorrect behavior or roles for which an update is available. When an incorrect behavior is detected or an update is available, the local monitor can initiate reconfiguration of a role at the acceleration component to address the error or update the role.

In a further aspect, acceleration components are locally linked to host components (e.g., CPUs). In these further aspects, a locally linked host component monitors an acceleration component for roles exhibiting incorrect behavior or roles for which an update is available. When an incorrect behavior is detected or an update is available, the host component can initiate reconfiguration of a role at the acceleration component to address the error or update the role.

In general, a data center deployment includes a hardware acceleration plane and a software plane. The hardware acceleration plane can include a plurality of networked acceleration components (e.g., FPGAs). The software plane can include a plurality of networked software-implemented host components (e.g., central processing units (CPUs)). A network infrastructure can be shared between the hardware acceleration plane and the software plane. In some environments, software-implemented host components are locally linked to corresponding acceleration components.

FIG. 1 illustrates an example architecture 102 that includes a software plane 104 and a hardware acceleration plane 106. The software plane 104 includes a collection of software-driven components (each denoted by the symbol "S") while the hardware plane includes a collection of hardware acceleration components (each denoted by the symbol "H"). For example, each host component may correspond to a server computer that executes machine-readable instructions using one or more central processing units (CPUs). Each CPU, in turn, may execute the instructions on one or more hardware threads. Each acceleration component can execute hardware logic for implementing functions, such as, for example, portions of services offer by a data center.

Hardware acceleration plane 106 can be constructed using a heterogeneous collection of acceleration components, including different types of acceleration components and/or the same type of acceleration components with different capabilities. For example, hardware acceleration plane 106 can include FPGA devices having different respective processing capabilities and architectures, a mixture of FPGA devices and other devices, and so on. Hardware acceleration plane 106 provides a reconfigurable fabric of acceleration components.

A host component generally performs operations using a temporal execution paradigm (i.e., sequentially) by using each of its CPU hardware threads to execute machine-readable instructions, one after the after. In contrast, an acceleration component may perform operations using a spatial paradigm (i.e., concurrently) by using a large number of parallel logic elements to perform computational tasks. Thus, an acceleration component can perform some operations in less time compared to a software-driven host component. In the context of the architecture 102, the "acceleration" qualifier associated with the term "acceleration component" reflects its potential for accelerating the functions that are performed by the host components.

In one example, architecture 102 corresponds to a data center environment that includes a plurality of computer servers. The computer servers correspond to the host components in the software plane 104. In another example, architecture 102 corresponds to an enterprise system. In a further example, the architecture 102 corresponds to a user device or appliance which uses at least one host component that has access to two or more acceleration components, etc. Other implementations for architecture 102 are also possible.

Common network infrastructure 120 couples host components in the software plane 104 to other host components and couples acceleration components in the hardware acceleration plane 106 to other acceleration components. That is, host components can use common network infrastructure 120 to interact with one another and acceleration components can use common network infrastructure 120 to interact with one another. Interaction among host components in the software plane 104 is independent of the interaction among acceleration components in the hardware acceleration plane 106. As such, two or more acceleration components may communicate in a transparent manner relative to host components in the software plane 104, outside the direction of the host components, and without the host components being "aware" of particular interaction is even taking place in the hardware acceleration plane 106.

Architecture 102 can use any of a variety of different protocols to facilitate communication between acceleration components over network infrastructure 120 and can use any of a variety of different protocols to facilitate communication between host components over network infrastructure 120. For example, architecture 102 can uses Ethernet protocol to transmit Internet Protocol (IP) packets over network infrastructure 120. In one implementation, each local host component in a server is given a single physical IP address. The local acceleration component in the same server may adopt the same IP address. The server can determine whether an incoming packet is destined for the local host component or destined for the local acceleration component in different ways. For example, packets that are destined for the local acceleration component can be formulated as UDP packets having a specific port; host-defined packets, on the other hand, may not be formulated in this way. In another example, packets belonging to the acceleration plane 106 can be distinguished from packets belonging to the software plane 104 based on the value of a status flag in each of the packets.

As such, architecture 102 can be viewed as two logical networks (software plane 104 and hardware acceleration plane 106) that share the same physical network communication links. Packets associated with the two logical networks may be distinguished from each other by their respective traffic classes.

In another aspect, each host component in the architecture 102 is coupled to at least one acceleration component in hardware acceleration plane 104 through a local link. For example, a host component and acceleration component can be arranged together and maintained as single serviceable unit (e.g., a server) within architecture 102. In this arrangement, the server can be referred to as the "local" host component to distinguish it from other host components that are associated with other servers. Similarly, acceleration component(s) of a server can be referred to as the "local" acceleration component(s) to distinguish them from other acceleration components that are associated with other servers.

As depicted in architecture 102, host component 108 is coupled to acceleration component 110 through a local link 112 (e.g., a Peripheral Component Interconnect Express (PCIe) link). Thus, host component 108 is a local host component form the perspective of acceleration component 110 and acceleration component 110 is a local acceleration component from the perspective of host component 108. The local linking of host component 108 and acceleration component 110 can form part of a server. More generally, host components in software plane 104 can be locally coupled to acceleration components in hardware acceleration plane 106 through many individual links collectively represented as a $local_H$-to-$local_S$ coupling 114.

Thus, a host component can interact directly with any locally linked acceleration components. As such, a host component can initiate communication to a locally linked acceleration component to cause further communication among multiple acceleration components. For example, a host component can issue a request for a service (or portion thereof) where functionality for the service (or portion thereof) is composed across a group of one or more acceleration components in hardware acceleration plane 106.

Thus, a host component can also interact indirectly with other acceleration components in hardware acceleration plane 106 to which the host component is not locally linked. For example, host component 108 can indirectly communicate with acceleration component 116 via acceleration component 110. More specifically, acceleration component 110 communicates with acceleration component 116 via a link 118 (e.g., network infrastructure 120).

Acceleration components in hardware acceleration plane 106 can be used to accelerate larger-scale services robustly in a data center. Substantial portions of complex datacenter services can be mapped to acceleration components (e.g., FPGAs) by using low latency interconnects for computations spanning multiple acceleration components. Acceleration components can also be reconfigured as appropriate to provide different service functionality at different times.

Figure 2:
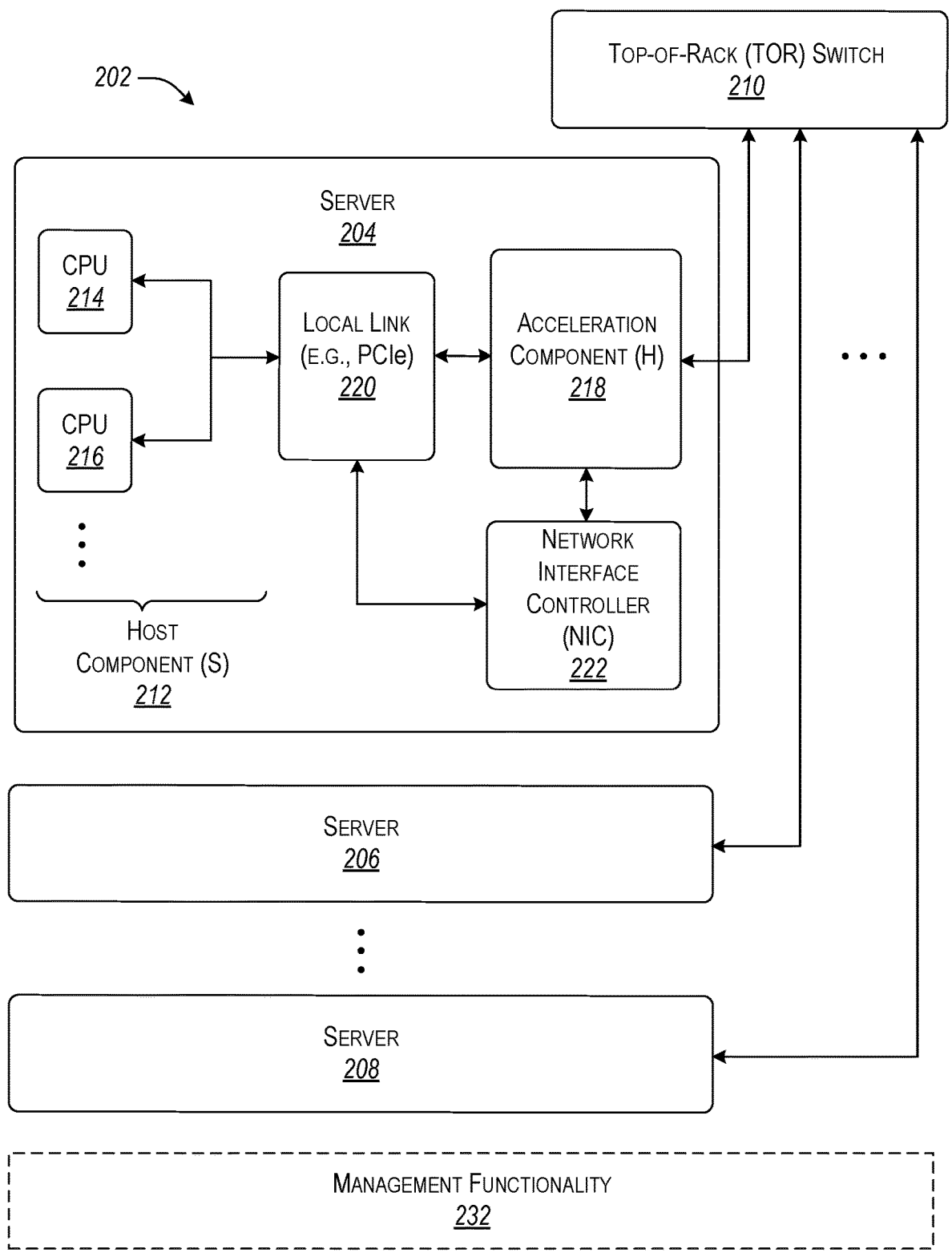
FIG. 2 illustrates an example architecture, including servers, that can be used in a data center

FIG. 2 illustrates an example architecture 202 that can be used in a data center. Servers 204, 206, and 208 can be included in a rack in the data center. Each of servers 204, 206, and 208 can be coupled to top-of-rack (TOR) switch 210. Other racks, although not shown, may have a similar configuration. Server 204 further includes host component 212 including CPUs 214, 216, etc. Host component 212 along with host components from servers 206 and 208 can be included in software plane 104. Server 204 also includes acceleration component 218. Acceleration component 218 along with acceleration components from servers 206 and 208 can be included in hardware acceleration plane 106.

Acceleration component 218 is directly coupled to host component 212 via local link 220 (e.g., a PCIe link). Thus, host component 212 can view acceleration component 218 as a local acceleration component and acceleration component 218 can view host component 212 as a local host component. Acceleration component 218 and host component 212 are also indirectly coupled by way of network interface controller 222 (e.g., used to communicate across network infrastructure 120). Server 204 can load images representing service functionality onto acceleration component 218.

Acceleration component 218 is also coupled to TOR switch 210. Hence, in architecture 202, acceleration component 218 represents the path through which host component 212 interacts with other components in the data center (including other host components and other acceleration components). Architecture 202 allows acceleration component 218 to perform processing on packets that are received from (and/or sent to) TOR switch 210 (e.g., by performing encryption, compression, etc.), without burdening the CPU-based operations performed by host component 212.

Management functionality 232 serves to manage the operations of architecture 202. Management functionality 232 can be physically implemented using different control architectures. For example, in one control architecture, the management functionality 232 may include plural local management components that are coupled to one or more global management components.

Figure 3:
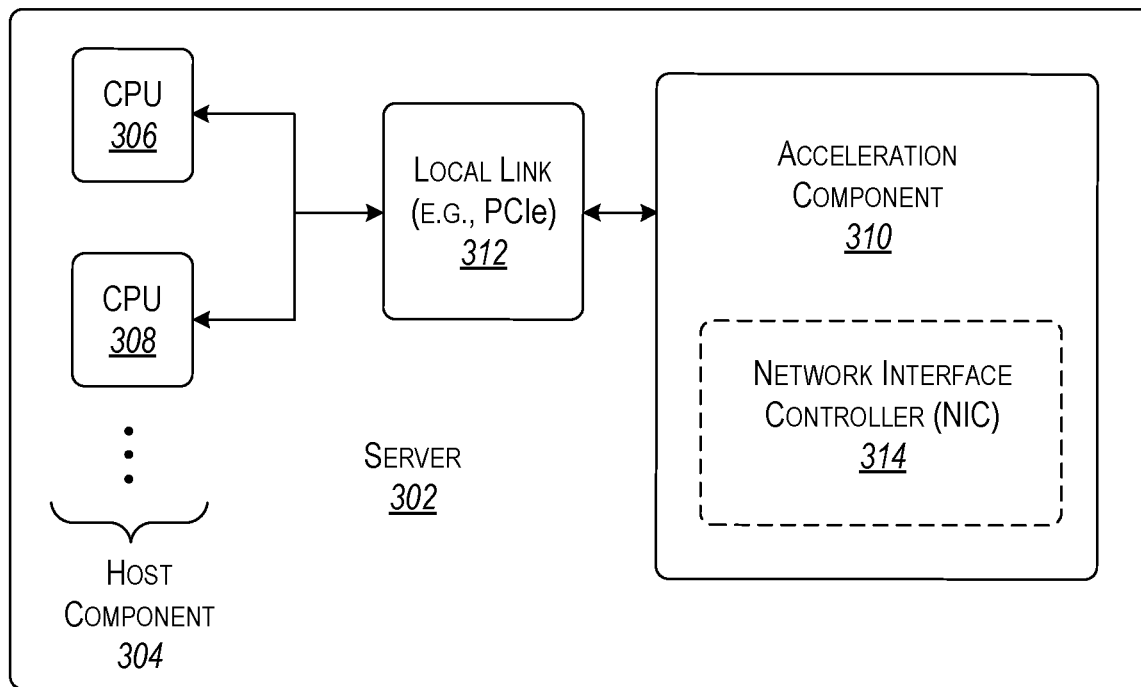
FIG. 3 illustrates an example server.

FIG. 3 illustrates an example server 302. Server 302 includes host component 304 including CPUs 306, 308, etc., acceleration component 310, and local link 312. Acceleration component 310 is directly coupled to host component 304 via local link 312 (e.g., a PCIe link). Thus, host component 304 can view acceleration component 310 as a local acceleration component and acceleration component 310 can view host component 304 as a local host component. Host component 304 and acceleration component 310 can be included in software plane 104 and hardware acceleration plane 106 respectively. Server 302 implements network interface controller (NIC) 314 as an internal component of acceleration component 310. Server 302 can load images representing service functionality onto acceleration component 310.

Figure 4:
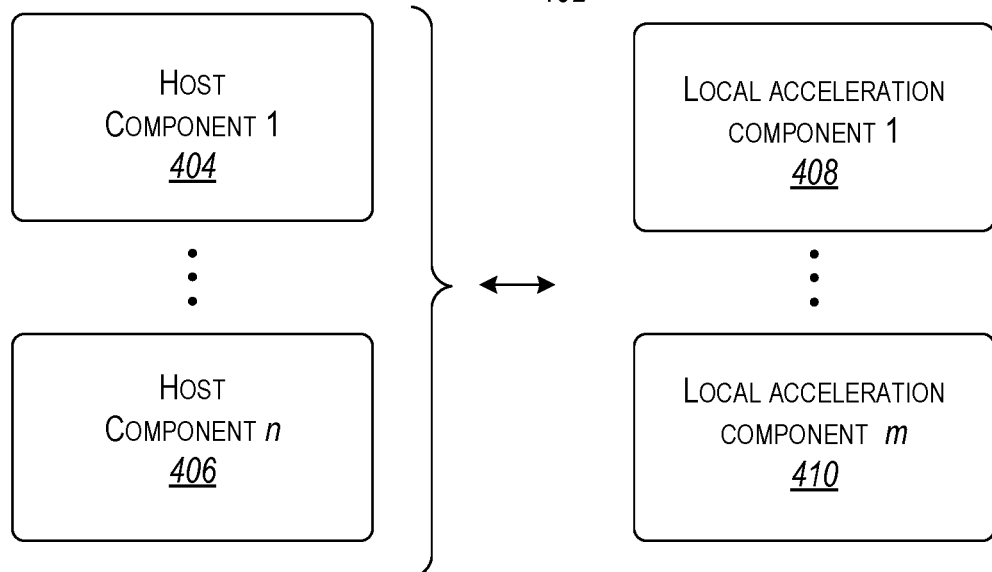
FIG. 4 illustrates an example server.

FIG. 4 illustrates an example server 402. Server 402 includes host components 404 through 406 including any number n of host components. Host components 404 through 406 can be included in software plane 104. Server 402 includes acceleration components 408 through 410 including any number m of acceleration components. Acceleration components 408 through 410 can be included in hardware acceleration plane 106. Server 402 can also include a network interface controller (not shown).

Server 402 can include a single host component locally linked to two acceleration components. The two acceleration components can perform different respective tasks. For example, one acceleration component can be used to process outgoing traffic to its local TOR switch, while the other acceleration component can be used to process incoming traffic from the TOR switch. In addition, server 402 can load images representing service functionality onto any of the acceleration components 408 through 410.

In general, a service (e.g., document ranking, encryption, compression, computer vision, speech translation, machine learning, etc.) can be implemented at one or more host components, at one or more acceleration components, or a combination of one or more host components and one or more acceleration components depending on what components are better suited to provide different portions of the service.

Figure 5:
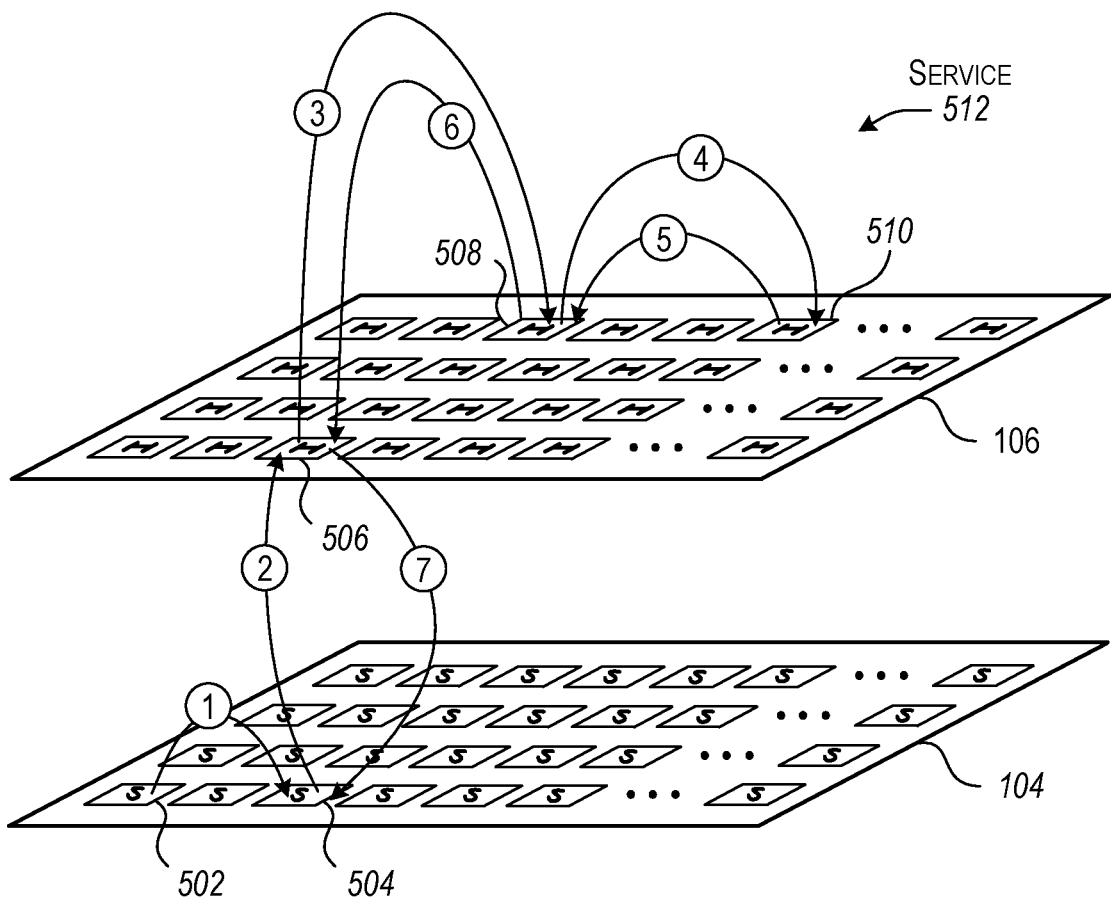
FIG. 5 illustrates an example service implemented using components of a software plane and components of a hardware acceleration plane.

FIG. 5 illustrates an example service 512 implemented using components of software plane 104 and components of hardware acceleration plane 106. In operation (1), host component 502 communicates with host component 504 in the course of performing a computational task. In operation (2) host component 504 then requests the use of service 512 that is implemented in the hardware acceleration plane 106 (although host component 504 may not be "aware" of where service 512 is implemented) by communicating with acceleration component 506 over a local link.

The requested service 512 is a composed service spread out over a plurality of acceleration components, each of which performs a specified portion of the service. Although acceleration component 506 was contacted to request use of the service 512, acceleration component 506 may not be the head of the composed service (or even be part of the multi-component service). Instead, acceleration component 508 may be the head component for the composed service.

As such, in operation (3), host component 504 indirectly communicates with acceleration component 508 via acceleration component 506. Acceleration component 508 then performs its portion of the composed service to generate an intermediate output result. In operation (4), acceleration component 508 then invokes acceleration component 510, which performs another respective portion of the composed service, to generate a final result. In operations (5), (6), and (7), the hardware acceleration plane 106 successively forwards the final result back to the requesting host component 504, through the same chain of components set forth above but in the opposite direction.

Operations in hardware acceleration plane 106 are performed in an independent manner of operations performed in the software plane 104. In other words, the host components in the software plane 104 do not manage the operations in the hardware acceleration plane 106. However, the host components may invoke the operations in the hardware acceleration plane 106 by issuing requests for services that are hosted by the hardware acceleration plane 106.

The hardware acceleration plane 106 operates in a manner that is transparent to a requesting host component. For example, host component 504 may be "unaware" of how its request is being processed in hardware acceleration plane 106, including the fact that the service corresponds to a composed service.

Communication in software plane 104 (e.g., corresponding to operation (1)) can take place using the same common network infrastructure 120 as communication in the hardware acceleration plane 106 (e.g., correspond to operations (3)-(6)). Operations (2) and (7) may take place over a local link, corresponding to the local$_H$-to-local$_S$ coupling 114 shown in FIG. 1.

Figure 6:
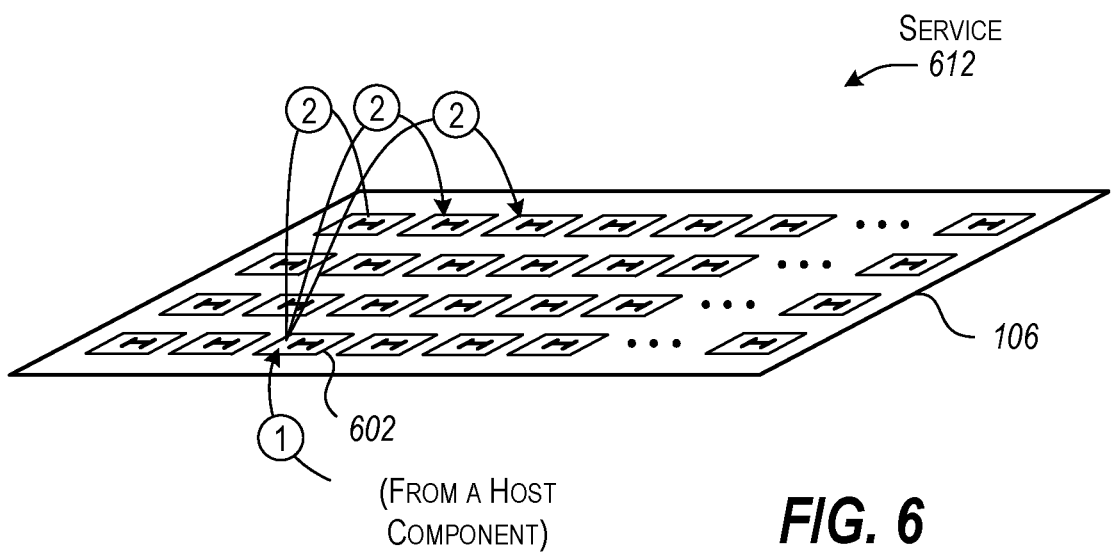
FIG. 6 illustrates an example service implemented using components of a software plane and components of a hardware acceleration plane.

FIG. 6 illustrates an example service 612 implemented using components of a software plane and components of hardware acceleration plane 106 Service 612 uses a different flow structure than service 512. More specifically, in operation (1), a host component (not shown) sends a request to its local acceleration component 602. In this example, local acceleration component 602 is also the head component of service 612. In operation (2), local acceleration component 602 may then forward one or more messages to a plurality of respective acceleration components. Each acceleration component that receives a message may perform a portion of a composed service in parallel with the other acceleration components. (FIG. 6 may represent only a portion of service 612, other portions of service 612 can be implemented at other hardware accelerators).

In general, an acceleration component can include any of variety of components some of which can be more or less common across different application images. Some components, such as, for example, a role, are distinct between application images. Other components, such as, for example, routers, transport components, switches, diagnostic recorders, etc., can be relatively common between some number of application images. These other relatively common components can be viewed as being included in an intermediate layer of abstraction or "soft shell". Further components, such as, for example, bridges, bypass controls, Network Interface Cards, Top of Rack Interfaces, buffers, memory controllers, PCIe controllers, Inter-FPGA network controllers, configuration memories and interfaces, host interfaces, debugging and back-channel interfaces (e.g., Joint Test Action Group (JTAG) interfaces, Inter-Integrated Circuit (I2C) interfaces, etc.), sensors, etc. can be very common between a higher number of (and essentially all) application images. These further very common components can be viewed as included in a greater layer of abstraction (e.g., than the other relatively common components) or "shell".

When an acceleration component (e.g., an FPGA) is reconfigured with new functionality, it is likely (although not guaranteed) that a role (i.e., the application-specific logic) at the acceleration component is changed. However, it is unlikely that existing functionality in the soft shell is changed and it is extremely unlikely that existing functionality in the shell is changed. Thus, components in the soft shell and to greater extent components in the shell provide a common interface for a role. As such, the shell allows code for a role to be ported relatively easy across different acceleration components.

Figure 7:
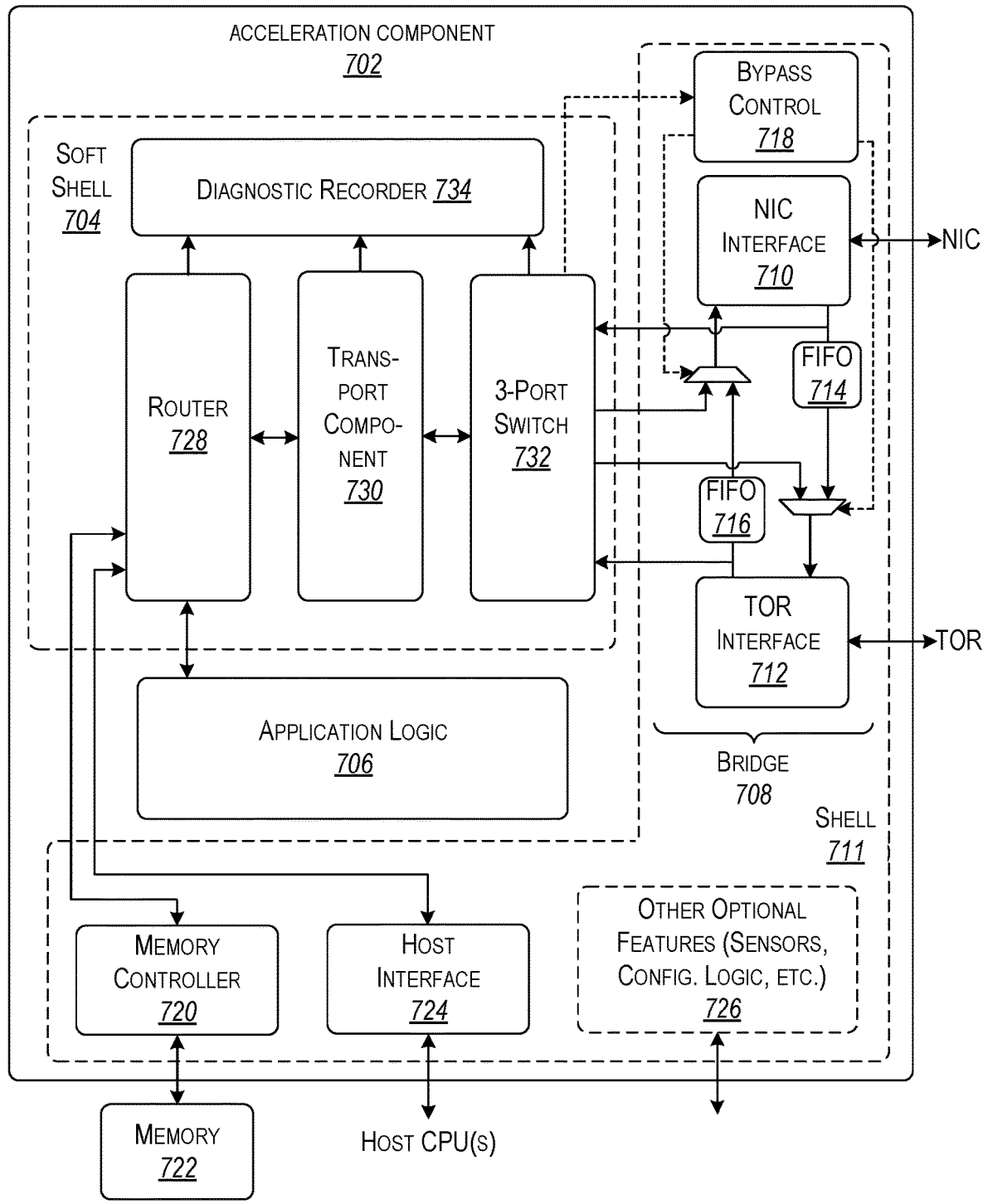
FIG. 7 illustrates an example architecture of an acceleration component.

Turning to FIG. 7, FIG. 7 illustrates an example architecture of an acceleration component 702. Acceleration component 702 can be included in hardware acceleration plane 106. Components included in acceleration component 702 can be implemented on hardware resources (e.g., logic blocks and programmable interconnects) of acceleration component 702.

Acceleration component 702 includes application logic 706, soft shell 704 associated with a first set of resources and shell 711 associated with a second set of resources. The resources associated with shell 711 correspond to lower-level interface-related components that generally remain the same across many different application scenarios. The resources associated with soft shell 704 can remain the same across at least some different application scenarios. The application logic 706 may be further conceptualized as including an application domain (e.g., a "role"). The application domain or role can represent a portion of functionality included in a composed service spread out over a plurality of acceleration components.

The application domain hosts application logic 706 that performs service specific tasks (such as a portion of functionality for ranking documents, encrypting data, compressing data, facilitating computer vision, facilitating speech translation, etc.). Resources associated with soft shell 704 are generally less subject to change compared to the application resources, and the resources associated with shell 711 are less subject to change compared to the resources associated with soft shell 704 (although it is possible to change (reconfigure) any component of acceleration component 702).

In operation, application logic 706 interacts with the shell resources and soft shell resources in a manner analogous to the way a software-implemented application interacts with its underlying operating system resources. From an application development standpoint, the use of common shell resources and soft shell resources frees a developer from having to recreate these common components for each service.

Referring first to the shell 711, shell resources include bridge 708 for coupling acceleration component 702 to the network interface controller (via a NIC interface 710) and a local top-of-rack switch (via a TOR interface 712). Bridge 708 also includes a data path that allows traffic from the NIC or TOR to flow into acceleration component 702, and traffic from the acceleration component 702 to flow out to the NIC or TOR. Internally, bridge 708 may be composed of various FIFOs (714, 716) which buffer received packets, and various selectors and arbitration logic which route packets to their desired destinations. A bypass control component 718, when activated, can control bridge 708 so that packets are transmitted between the NIC and TOR without further processing by the acceleration component 702.

Memory controller 720 governs interaction between the acceleration component 702 and local memory 722 (such as DRAM memory). The memory controller 720 may perform error correction as part of its services.

Host interface 724 provides functionality that enables acceleration component 702 to interact with a local host component (not shown). In one implementation, the host interface 724 may use Peripheral Component Interconnect Express (PCIe), in conjunction with direct memory access (DMA), to exchange information with the local host component. The outer shell may also include various other features 726, such as clock signal generators, status LEDs, error correction functionality, and so on.

Turning to soft shell 704, router 728 is for routing messages between various internal components of the acceleration component 702, and between acceleration component 702 and external entities (e.g., via a transport component 730). Each such endpoint is associated with a respective port. For example, router 728 is coupled to memory controller 720, host interface 724, application logic 706, and transport component 730.

Transport component 730 formulates packets for transmission to remote entities (such as other acceleration components), and receives packets from the remote entities (such as other acceleration components). A 3-port switch 732, when activated, takes over the function of the bridge 708 by routing packets between the NIC and TOR, and between the NIC or TOR and a local port associated with the acceleration component 702.

Diagnostic recorder 734 can store information regarding operations performed by the router 728, transport component 730, and 3-port switch 732 in a circular buffer. For example, the information may include data about a packet's origin and destination IP addresses, host-specific data, timestamps, etc. A technician may study a log of the information in an attempt to diagnose causes of failure or sub-optimal performance in the acceleration component 702.

A plurality of acceleration components similar to acceleration component 702 can be included in hardware acceleration plane 106.

Acceleration components can use different network topologies (instead of using common network infrastructure 120 for communication) to communicate with one another. In one aspect, acceleration components are connected directly to one another, such as, for example, in a two dimensional torus.

Figure 8:
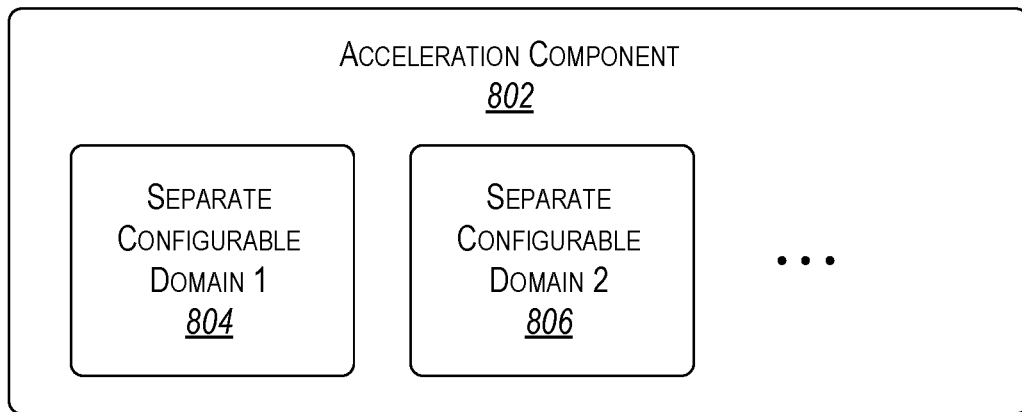
FIG. 8 illustrates an acceleration component including separate configurable domains.

FIG. 8 illustrates an acceleration component 802 including separate configurable domains 804, 806, etc. A configuration component (not shown) can configure each configurable domain without affecting other configurable domains. Hence, the configuration component can configure one or more configurable domains while the other configurable domains are executing operations based on their respective configurations, which are not disturbed.

Figure 9:
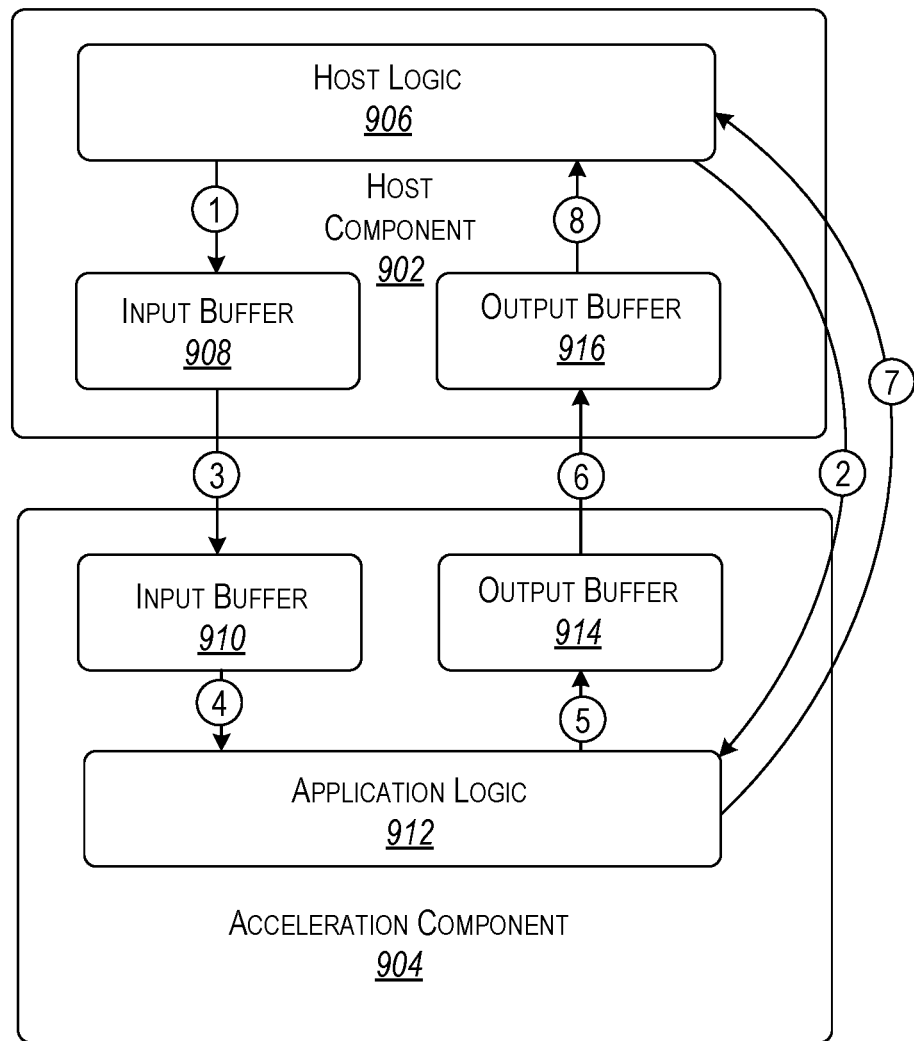
FIG. 9 illustrates functionality for performing data transfer between a local host component and an associated local hardware acceleration component.

FIG. 9 illustrates functionality for performing data transfer between a host component 902 and an associated (e.g., locally linked) acceleration component 904. Data can be transferred via a host interface (e.g., host interface 724), for example, using PCIe in conjunction with DMA memory transfer). In operation (1), host logic 906 places data to be processed into kernel-pinned input buffer 908 in main memory associated with the host logic 906. In operation (2), the host logic 906 instructs the acceleration component 904 to retrieve the data and begin processing it. The host logic's thread is then either put to sleep until it receives a notification event from the acceleration component 904, or it continues processing other data asynchronously. In operation (3), the acceleration component 904 transfers the data from the host logic's memory and places it in an acceleration component input buffer 910.

In operations (4) and (5), the application logic 912 retrieves the data from the input buffer 910, processes it to generate an output result, and places the output result in an output buffer 914. In operation (6), the acceleration component 904 copies the contents of the output buffer 914 into output buffer 916 (in the host logic's memory). In operation (7), acceleration component 904 notifies the host logic 906 that the data is ready for it to retrieve. In operation (8), the host logic thread wakes up and consumes the data in the output buffer 916. Host logic 906 may then discard the contents of the output buffer 916, which allows the acceleration component 904 to reuse it in the next loading operation.

Figure 10:
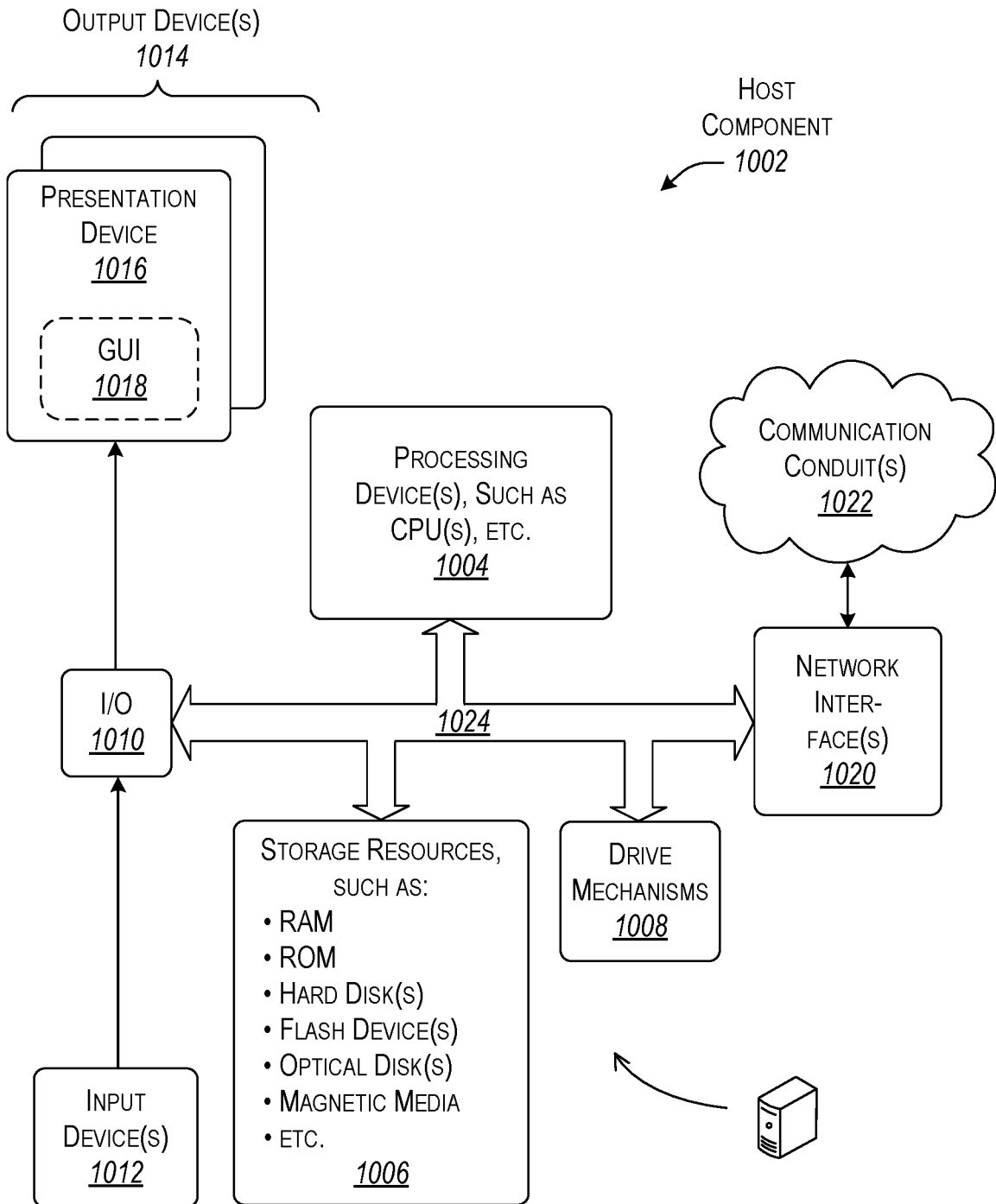
FIG. 10 illustrates an example architecture of a host component.

FIG. 10 illustrates an example architecture of a host component 1002. Host component 1002 can include one or more processing devices 1004, such as one or more central processing units (CPUs). Host component 1002 can also include any storage resources 1006 for storing any kind of information, such as code, settings, data, etc. Without limitation, for instance, storage resources 1006 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of host component 1002. In one case, host component 1002 may perform any of the operations associated with local tenant functionality when processing devices 1004 carry out associated instructions stored in any storage resource or combination of storage resources. Host component 1002 also includes one or more drive mechanisms 1008 for interacting with any storage resource, such as a hard disk drive mechanism, an optical disk drive mechanism, and so on.

Host component 1002 also includes an input/output module 1010 for receiving various inputs (via input devices 1012), and for providing various outputs (via output devices 1014). One particular output mechanism may include a presentation device 1016 and an associated graphical user interface (GUI) 1018. Host component 1002 can also include one or more network interfaces 1020 for exchanging data with other devices via one or more communication conduits 1022. One or more communication buses 1024 communicatively couple the above-described components together.

Communication conduit(s) 1022 can be implemented in any manner, e.g., by a local area network, a wide area network (e.g., the Internet), point-to-point connections, etc., or any combination thereof. Communication conduit(s) 1022 can include any combination of hardwired links, wireless links, routers, gateway functionality, name servers, etc., governed by any protocol or combination of protocols.

A plurality of host components similar to host component 1002 can be included in software plane 104.

Figure 11:
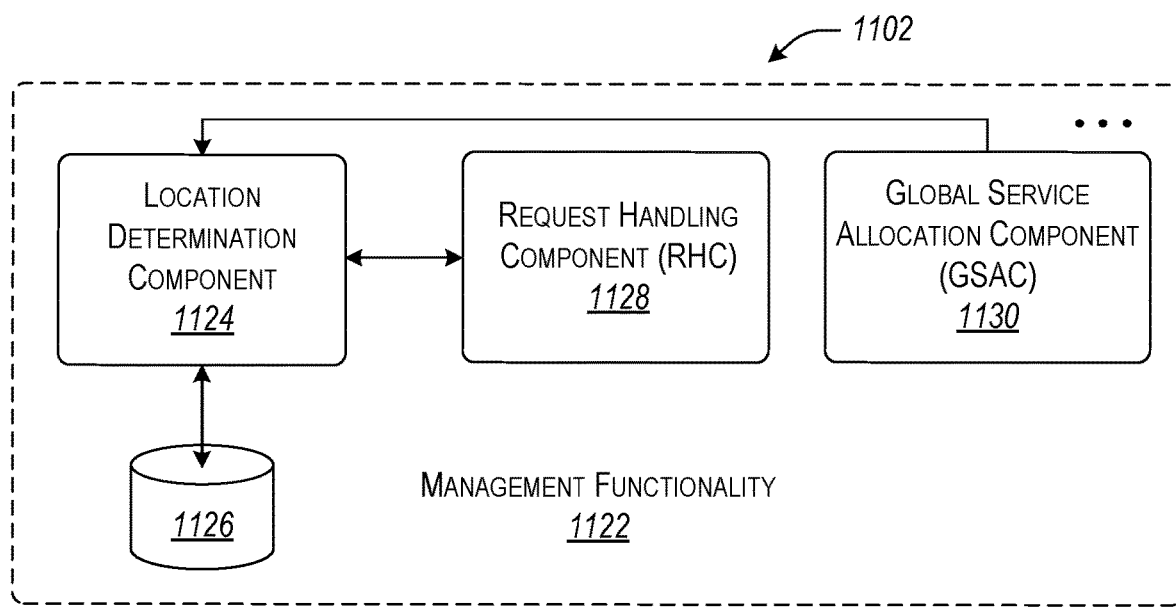
FIG. 11 illustrates an example architecture of management functionality for managing services in a data center.

FIG. 11 illustrates an example architecture 1102 of management functionality 1122 for managing services in a data center. Management functionality 1122 can include a number of sub-components that perform different respective functions (which can be physically implemented in different ways). Architecture 1102 can be included in architecture 102. As such, management functionality 1122 as well as other associated components can be implemented on hardware resources of a host component (e.g., in software plane 104) and/or implemented on hardware resources of an acceleration component (e.g., in hardware acceleration plane 106). Host component hardware resources can include any of the hardware resources associated with host component 1002. Acceleration component hardware resources can include any of the hardware resources associated with acceleration component 702.

A local determination component 1124, for example, can identify the current locations of services within architecture 102, based on information stored in a data store 1126. In operation, location determination component 1124 may receive a request for a service. In response, location determination component 1124 returns an address associated with the service, if that address is present in data store 1126. The address may identify a particular acceleration component in hardware acceleration plane 106 that hosts (or is the head of) the requested service.

Request handling component (RHC) 1128 processes requests for services made by instances of tenant functionality. For example, an instance of tenant functionality may correspond to a software program running on a particular local host component. That software program may request a service in the course of its execution. The RHC 1128 handles the request by determining an appropriate component in architecture 102 to provide the service. Possible components for consideration include: a local acceleration component (associated with the local host component from which the request originated); a remote acceleration component; and/or the local host component itself (whereupon the local host component implements the service in software). RHC 1128 makes its determinations based on one or more request handling considerations, such as whether the requested service pertains to a line-rate service. Further, the RHC 1128 may interact with the location determination component 1124 in performing its functions.

A global service allocation component (GSAC) 1130 can operate in a background and global mode, allocating services to acceleration components based on global conditions in architecture 102 (rather than handling individual requests from instances of tenant functionality, as does RHC 1128). For example, GSAC 1130 may invoke its allocation function in response to a change in demand that affects one or more services. GSAC 1130 makes its determinations based on one or more allocation considerations, such as the historical demand associated with the services, etc. Further, the GSAC 1130 may interact with the location determination component 1124 in performing its functions. A sub-component of GSAC 1130 can also manage multi-component and/or composed services. A multi-component service is a service that is composed of plural parts. Plural respective acceleration components perform the respective parts.

Figure 12:
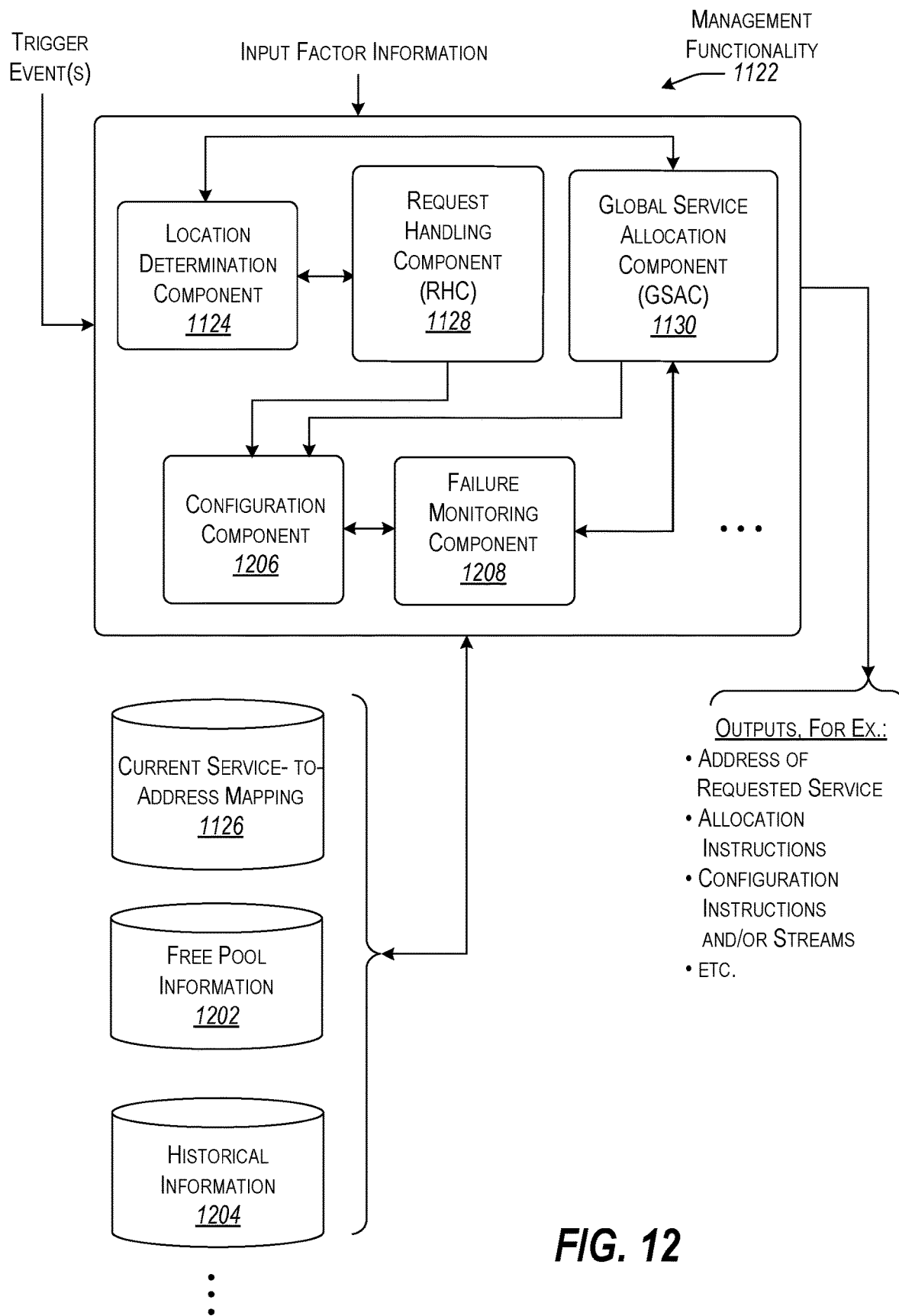
FIG. 12 illustrates an example architecture with additional components of the management functionality of FIG. 11.

FIG. 12 illustrates an example architecture with additional components of management functionality 1122. As described, location determination component 1124 identifies the current location of services within architecture 102, based on information stored in the data store 1126. In operation, the location determination component 1124 receives a request for a service. In response, it returns the address of the service, if present within the data store 1126. The address may identify a particular acceleration component that implements the service.

Request handling component (RHC) 1128 handles requests for services by tenant functionality that resides on the host components. In response to each request by a local host component, RHC 1128 determines an appropriate component to implement the service. For example, RHC 1128 may choose from among: a local acceleration component (associated with the local host component that made the request), a remote acceleration component, or the local host component itself (whereupon the local host component will implement the service in software), or some combination thereof. RHC 1128 performs its determinations based on one or more request handling considerations.

General allocation component (GSAC) 1130, on the other hand, operates by globally allocating services to acceleration components within architecture 102 to meet overall anticipated demand in the data processing system and/or to satisfy other objectives (rather than individual requests by host components). In performing its functions, the GSAC component 1130 may draw on a data store 1202 that provides free pool information. The free pool information identifies acceleration components that have free capacity to implement one or more services. The GSAC 1130 can also receive input information that has a bearing on its allocation decisions. One such piece of input information pertains to historical demand information associated with a service, e.g., as maintained in a data store 1204.

GSAC 1130 and RHC 1128 may use, in part, common logic in reaching their allocation decisions, and that common logic may, in part, taken into account similar allocation considerations. Further, both RHC 1128 and GSAC 1130 interact with the location determination component 124 in the course of performing their respective operations. Otherwise, as described, the GSAC 1130 frames its decisions in a global context, whereas the RHC 1128 is an on-demand component that is primarily focused on satisfying specific requests.

Configuration component 1206 configures acceleration components, e.g., by sending a configuration steam to the acceleration components. A configuration stream specifies the logic (e.g., an image) to be "programmed" into a recipient acceleration component. The configuration component 1206 may use different strategies to configure an acceleration component.

The failure monitoring component 1208 determines whether a previously configured acceleration component has failed. Various components of the management functionality 1122 may respond to failure notification by substituting a spare acceleration component for a failed acceleration component, reconfiguring an acceleration component, partial reconfiguring acceleration component, reloading data in an acceleration component, etc.

As described, functionality for a service or portion thereof can be provided by linking roles from a group of interoperating acceleration components. The linked roles can be composed in a directed graph in any variety of different ways, including a directed acyclic graph, a directed cyclic graph, etc., to provide service functionality and/or acceleration. For example, in some aspects, linked roles are composed in a pipeline or ring.

Figure 13A:
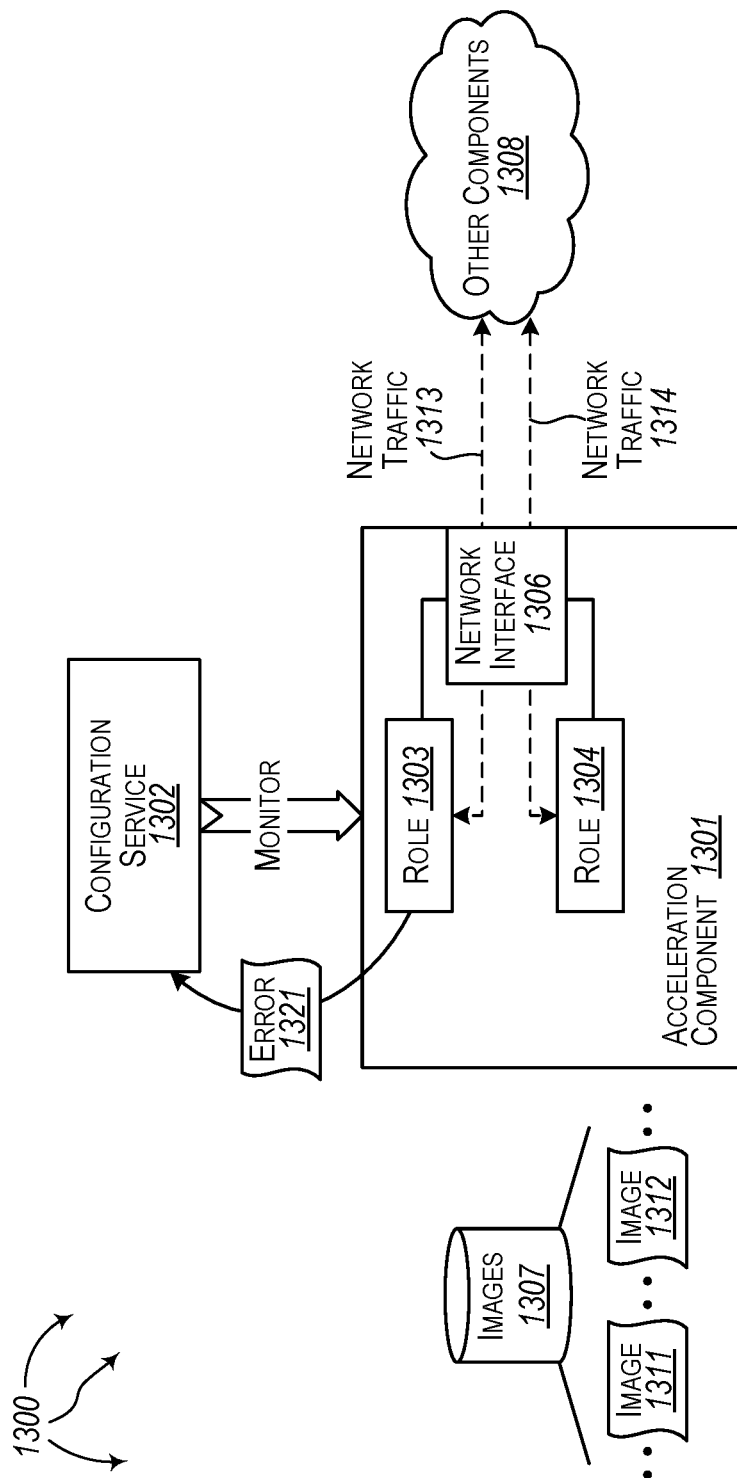
FIGS. 13A-13D illustrate an example architecture that facilitates partially reconfiguring an acceleration component.

FIGS. 13A-13D illustrate an example architecture 1300 that facilitates partially reconfiguring an acceleration component. Referring initially to FIG. 13A, computer architecture 1300 includes acceleration component 1301, configuration service 1302, images 1307, and other components 1308. Acceleration component 1301, configuration service 1302, images 1307, and other components 1308 can be connected to (or be part of) a network, such as, for example, a Local Area Network ("LAN"), a Wide Area Network ("WAN"), and even the Internet. Accordingly, acceleration component 1301, configuration service 1302, images 1307, and other components 1308 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network. In one aspect, acceleration component 1301, configuration service 1302, images 1307, and other components 1308 are connected to network infrastructure 120.

Acceleration component 1301 can include an array of programmable logic blocks and a hierarchy of reconfigurable interconnects that allow logic blocks to be connected together in different configurations (to provide different functionality (i.e., different roles)). Image files can be loaded at acceleration component 1301 to configure programmable logic blocks and configure interconnects to provide desired functionality. Images 1307 include one or more images including images 1311, 1312, etc. Images 1307 can be at a network location and/or local to acceleration component 1031. As such, one or more image files from images 1307 can be loaded at acceleration component 1301 to configure acceleration component 1301 to provide role 1303, role 1304, and network interface 1306.

Acceleration component 1301 can be included in one or more groups of interoperating acceleration components. Within each group of interoperating components, acceleration component 1301 can provide a role. The role can be linked together with roles at other acceleration components in the group of interoperating components to compose a graph providing hardware acceleration for a service. For example, acceleration component 1301 can provide role 1303 to one graph and can provide role 1304 to another different graph.

Other components 1308 can include other acceleration components (e.g., in hardware acceleration plane 106) and host components (e.g., in software plane 104). Network interface 1306 facilitates network communication between role 1303 and other components 1308 and between role 1304 and other components 1308.

For example, role 1303 can exchange network traffic 1313 with other components 1308. Network traffic 1313 can include network traffic originating at role 1303 or network traffic being routed from one component in other components 1308 to another component in other components 1308 (e.g., between components in a graph). Similarly, role 1304 can exchange network traffic 1314 with other components 1308. Network traffic 1314 can include network traffic originating at role 1304 or network traffic being routed from one component in other components 1308 to another component in other components 1308 (e.g., between components in a graph).

Configuration service 1302 can monitor the operation of acceleration component 1301. Configuration service 1302 can be a higher level monitoring service (e.g., on network infrastructure 120), located at a locally linked host component, or even internal to acceleration component 1301. Configuration service 1302 can monitor acceleration component 1301 for incorrect behaviors and/or for functionality that is to be updated. When configuration service 1302 detects incorrect behavior or that an update is appropriate, configuration service 1302 can initiate a partial reconfiguration of acceleration component 1301. Thus, when configuration service 1302 is internal to acceleration component 1301, acceleration component 1301 can self-initiate a partial reconfiguration.

Figure 14:
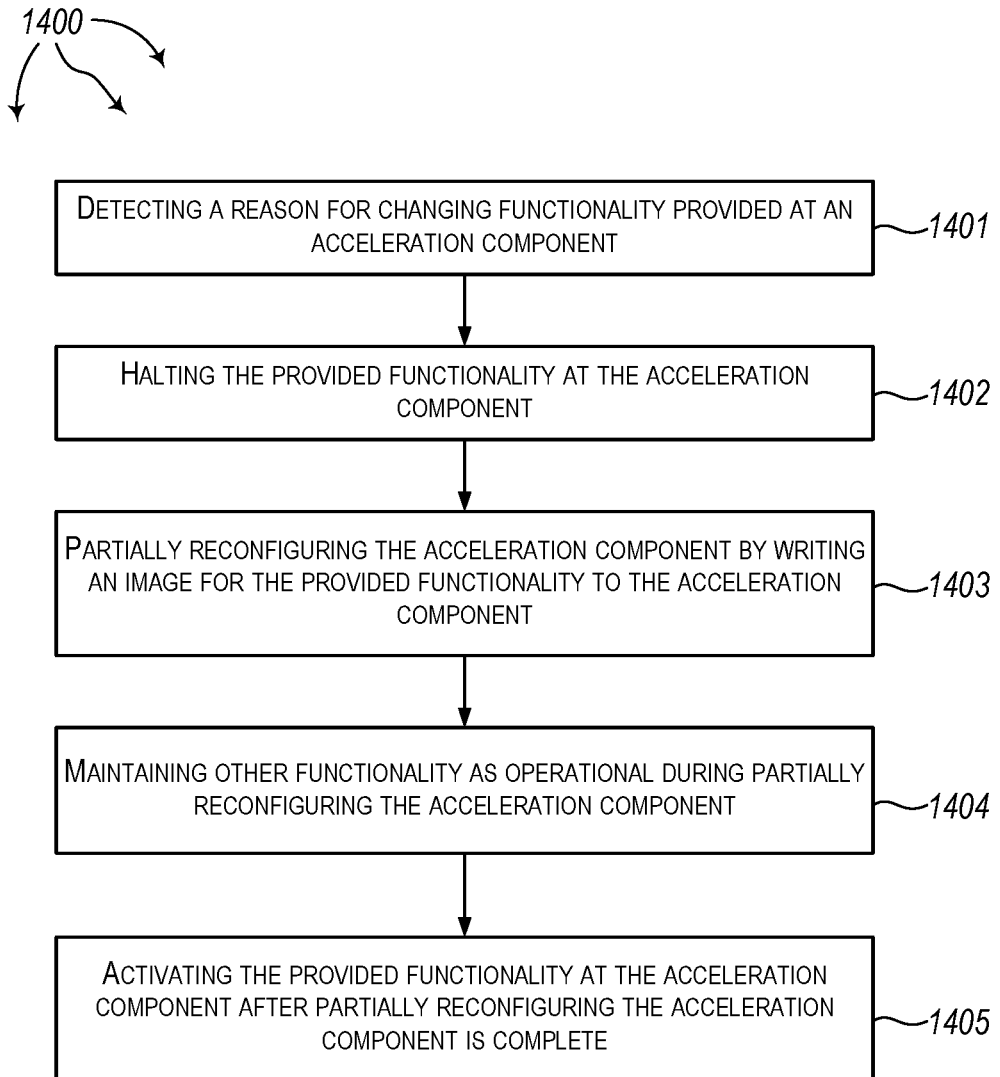
FIG. 14 illustrates a flow chart of an example method for partially reconfiguring an acceleration component.

Turning to FIG. 14, FIG. 14 illustrates a flow chart of an example method 1400 for partially reconfiguring an acceleration component. Method 1400 will be described with respect to the components and data of computer architecture 1300.

Method 1400 includes detecting a reason for changing functionality provided at an acceleration component (1401). For example, configuration service 1302 can detect error 1321 in the operation of role 1303. Alternately, configuration service 1303 can detect that there is an update available for role 1303.

Figure 13B:
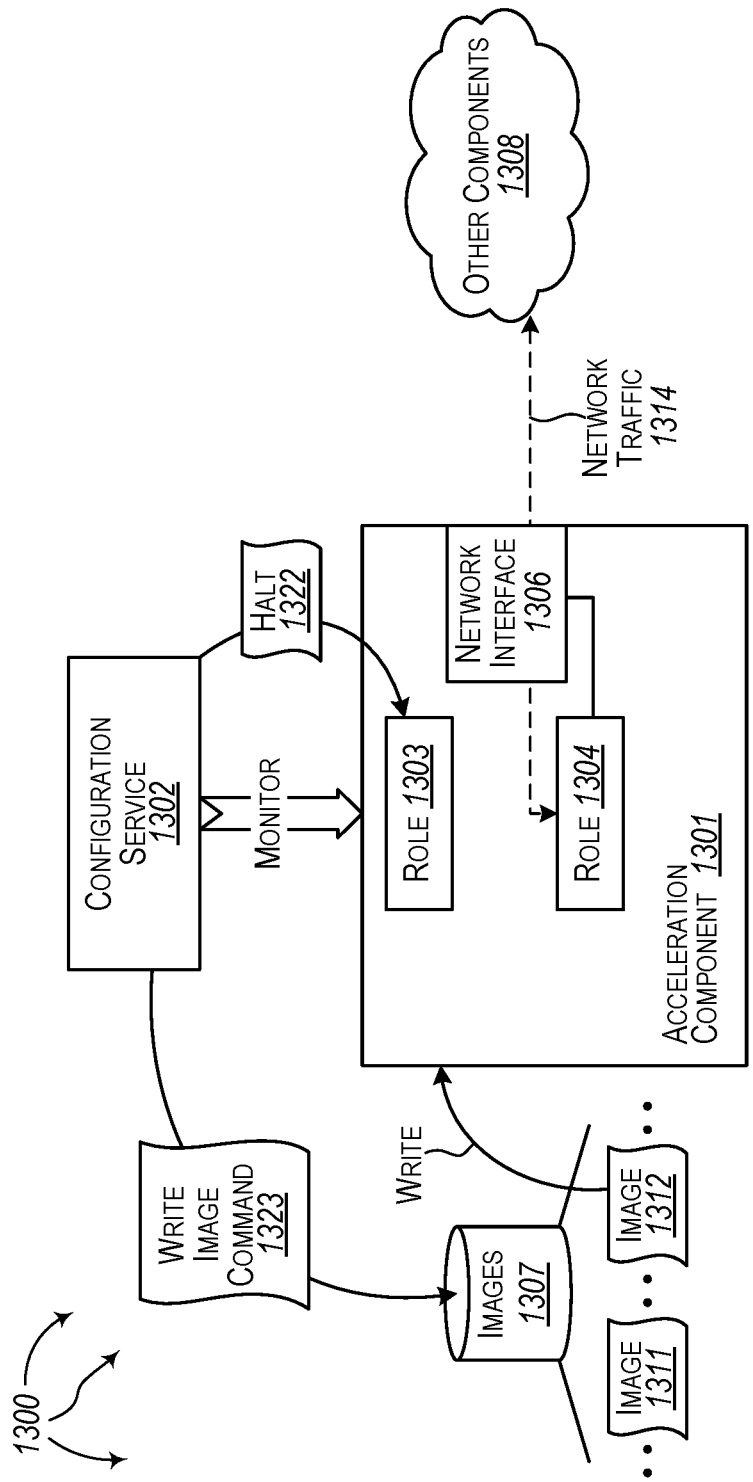
Figure 13C:
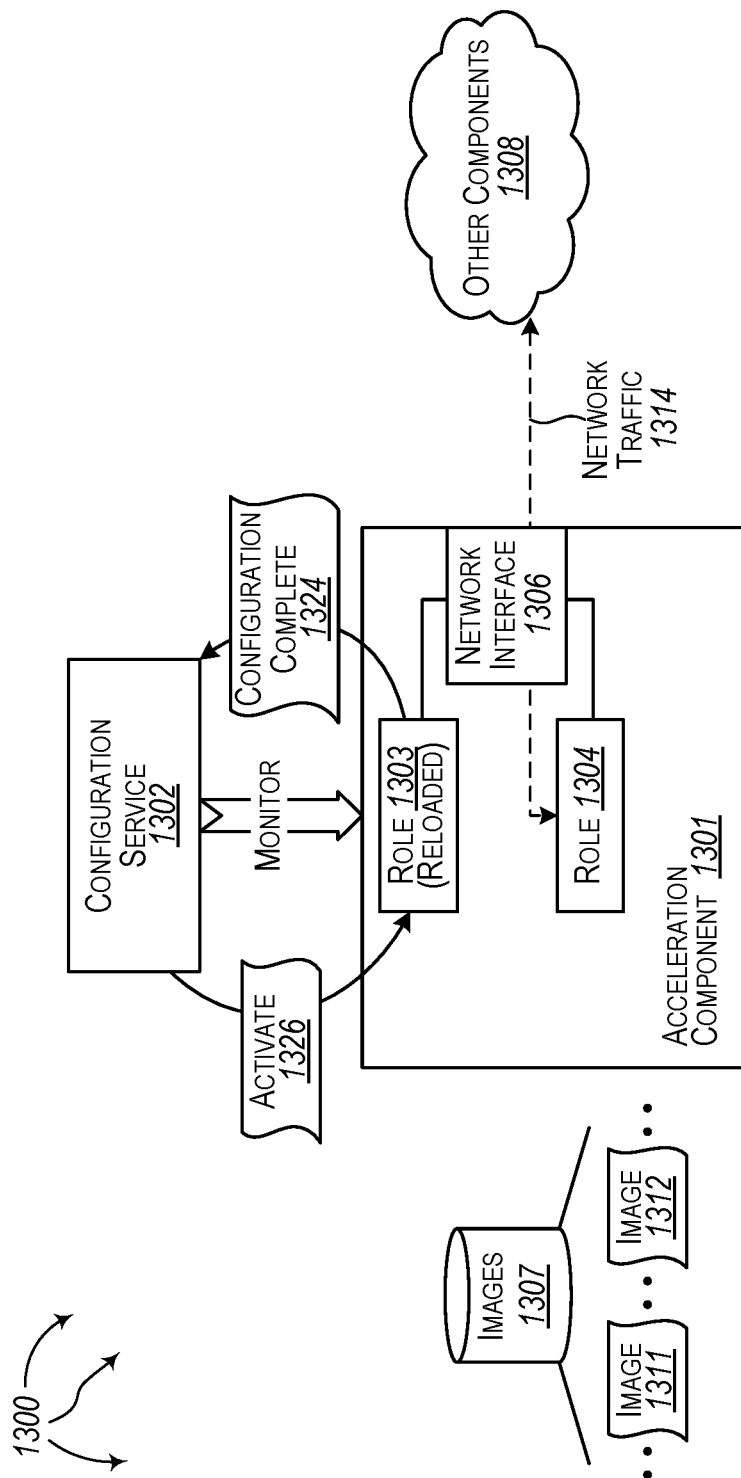

Method 1400 includes halting the provided functionality at the acceleration component (1402). Turning to FIG. 13B, configuration service 1302 sends halt message 1322 to role 1303. In response, role 1303 can halt operation. Halting operation of role 1303 can include halting transmission of data from role 1303 (i.e., telling role 1303 to stop transmitting). When appropriate, configuration service 1302 can also notify upstream and downstream components of role 1303 (e.g., in the same graph) that role 1303 is being halted. When appropriate, configuration service 1302 may also send halt messages to upstream and downstream components of role 1303. The halt messages instruct upstream and stream components of role 1303 to stop receiving data from role 1303 (i.e., to not listen to role 1303). In response, upstream and stream components of role 1303 can stop listening to role 1303. Upstream and downstream components can also take appropriate actions with in-process data (e.g., buffer, drop, send NACKs to other components, etc.) until role 1303 is again operational.

Method 1400 includes partially reconfiguring the acceleration component by writing an image for the provided functionality to the acceleration component (1403). For example, configuration service 1302 can send write image command 1323 to images 1307. Write image command 1323 causes image 1312 to be written from images 1307 to acceleration component 1301. Writing image 1312 to acceleration component 1301 reprograms programmable logic blocks and reconfigurable interconnects to provide role 1303. Reprogramming can address error 1321. Alternately, reprogramming can be used to update role 1303.

Method 1400 includes maintaining other functionality as operational during partially reconfiguring the acceleration component (1404). For example, role 1304 as well as functionality in a shell or soft shell can be maintained as operational during reconfiguration of role 1303. For example, network interface 1306 can be maintained as operational during reconfiguration of role 1303. As such, role 1304 can continue to route network traffic 1314 between acceleration component 1301 and other components 1308 through network interface 1306 during reconfiguration of role 1303.

Method 1400 includes activating the provided functionality at the acceleration component after partially reconfiguring the acceleration component is complete (1405). For example, turning to FIG. 13C, when role 1303 is successfully reloaded, role 1303 (reloaded) can send configuration complete message 1324 to configuration service 1302. In response to configuration complete message 1324, configuration service 1302 can send activate command 1326 to role 1303 (reloaded). In response to activate command 1326, role 1303 (reloaded) can again process data and route network traffic. When appropriate, configuration service 1302 can link role 1303 (reloaded) with upstream and downstream components in a graph and notify the upstream and downstream components that role 1303 (reloaded) is operational. Upstream and downstream components can then take appropriate actions to interoperate with role 1303 (reloaded).

Figure 13D:
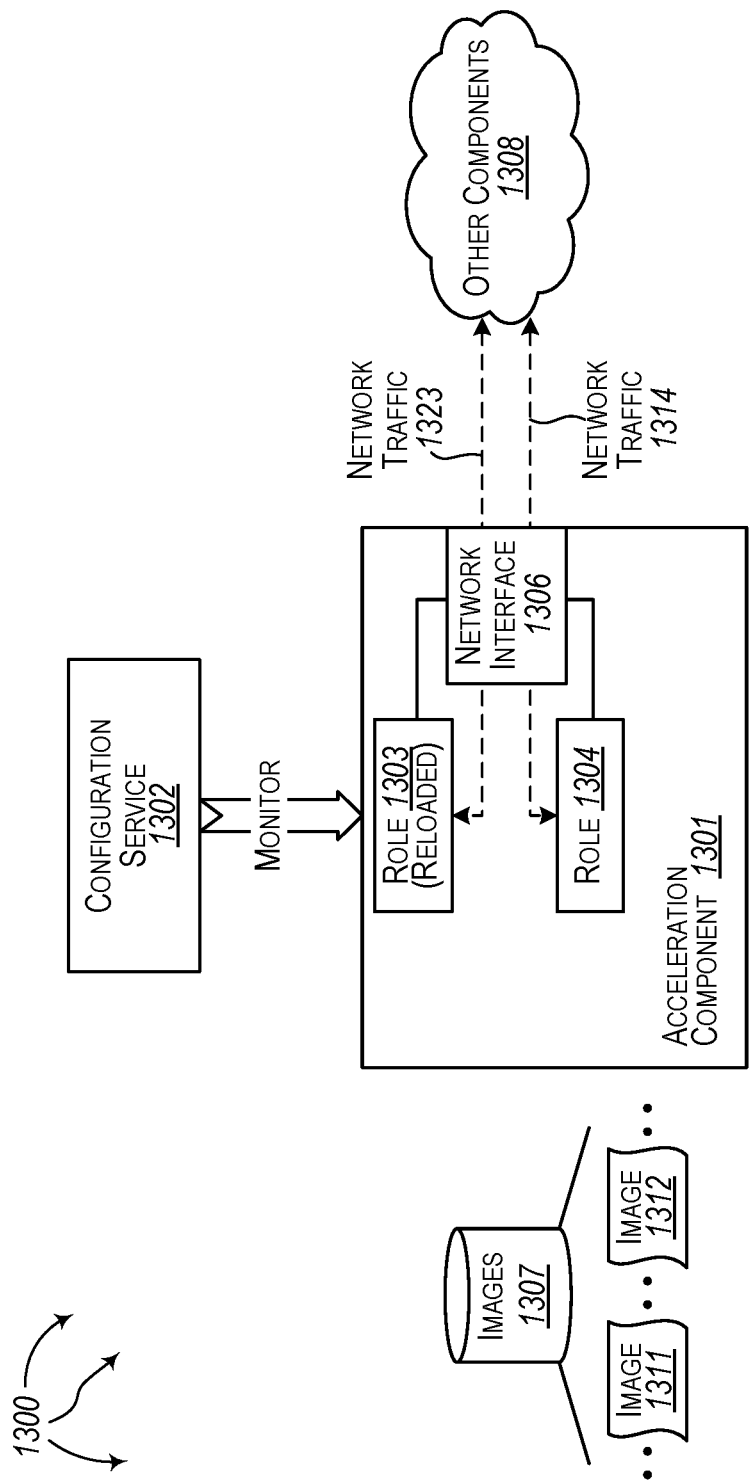

Turning to FIG. 13D, role 1303 (reloaded) can exchange network traffic 1323 with other components 1308. Network traffic 1323 can include network traffic originating at role 1303 (reloaded) or network traffic being routed from one component in other components 1308 to another component in other components 1308 (e.g., between components in a graph).

FIGS. 13A-13D illustrate reconfiguring role 1303 while role 1304 remains operational. During reconfiguration of role 1303, resources associated a shell (e.g., network interface 1306) and/or a soft shell at acceleration component 1301 can also remain operational. Other aspects include an acceleration component with a single role. In these other aspects, resources associated with a shell and/or soft shell cat the acceleration component can remain operational while the role is reconfigured or even when a new role is loaded at the acceleration component.

Figure 15A:
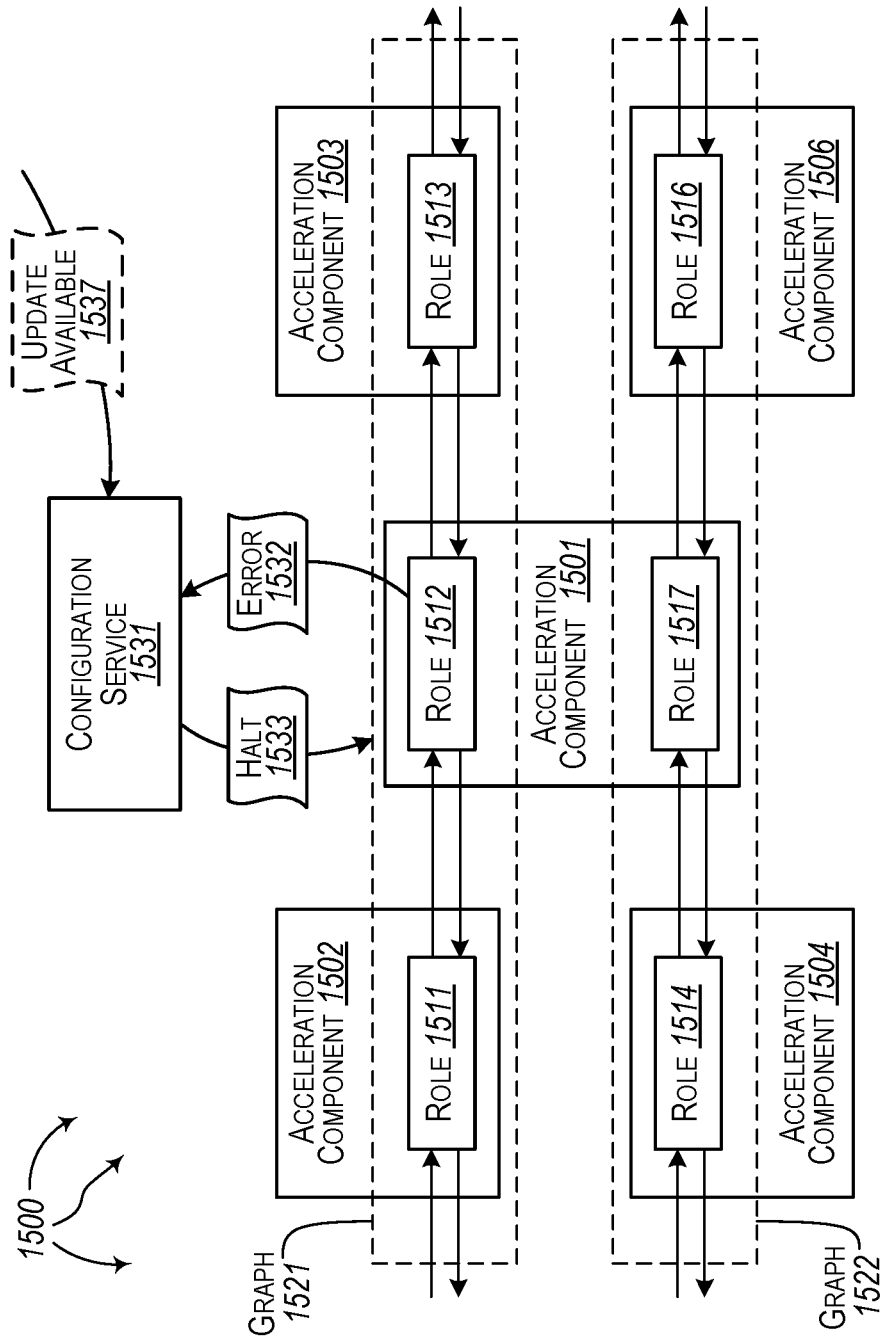
FIGS. 15A-15C illustrate an example architecture that facilitates partially reconfiguring an acceleration component that has roles included in multiple graphs.
Figure 15B:
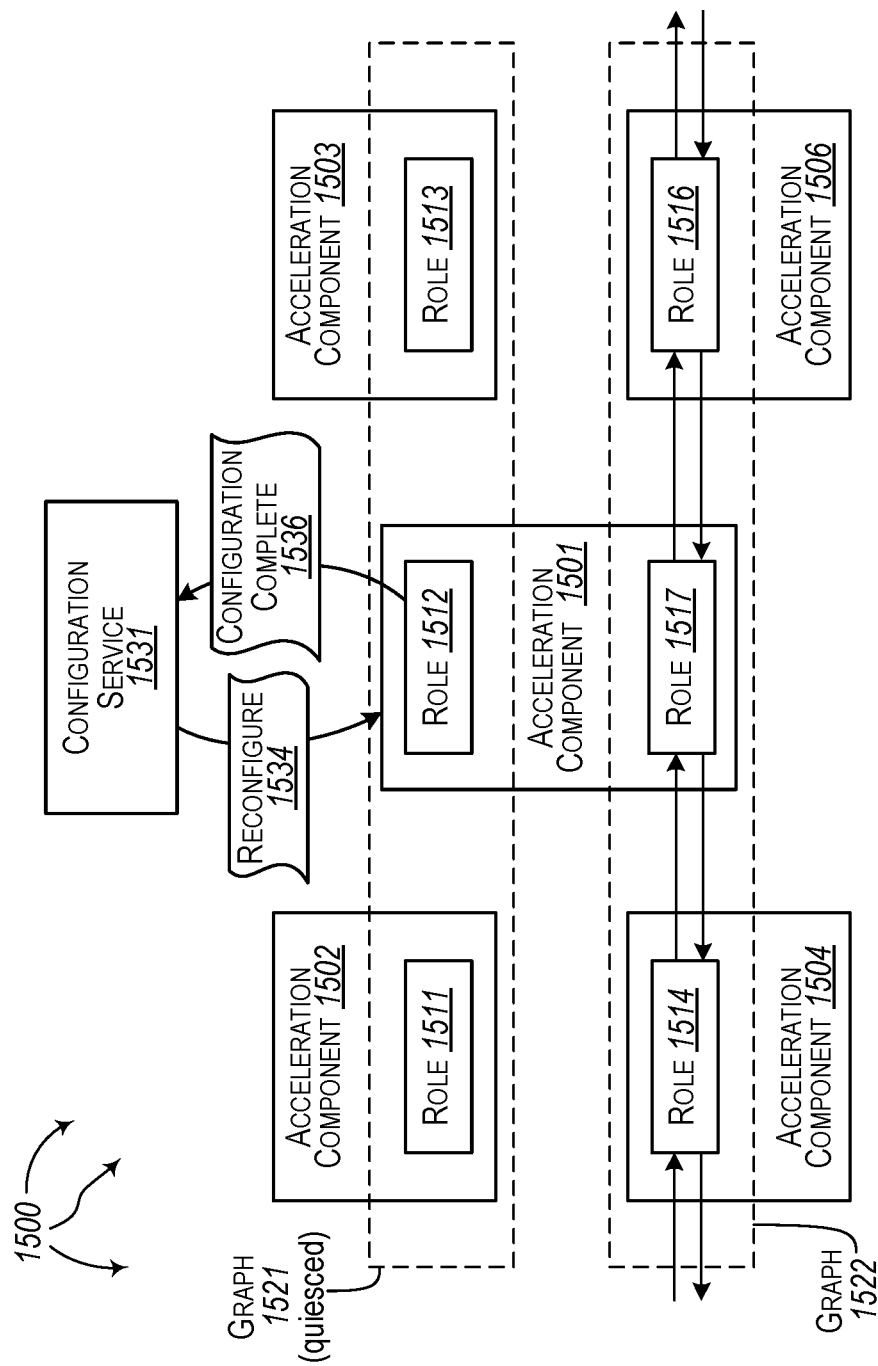
Figure 15C:
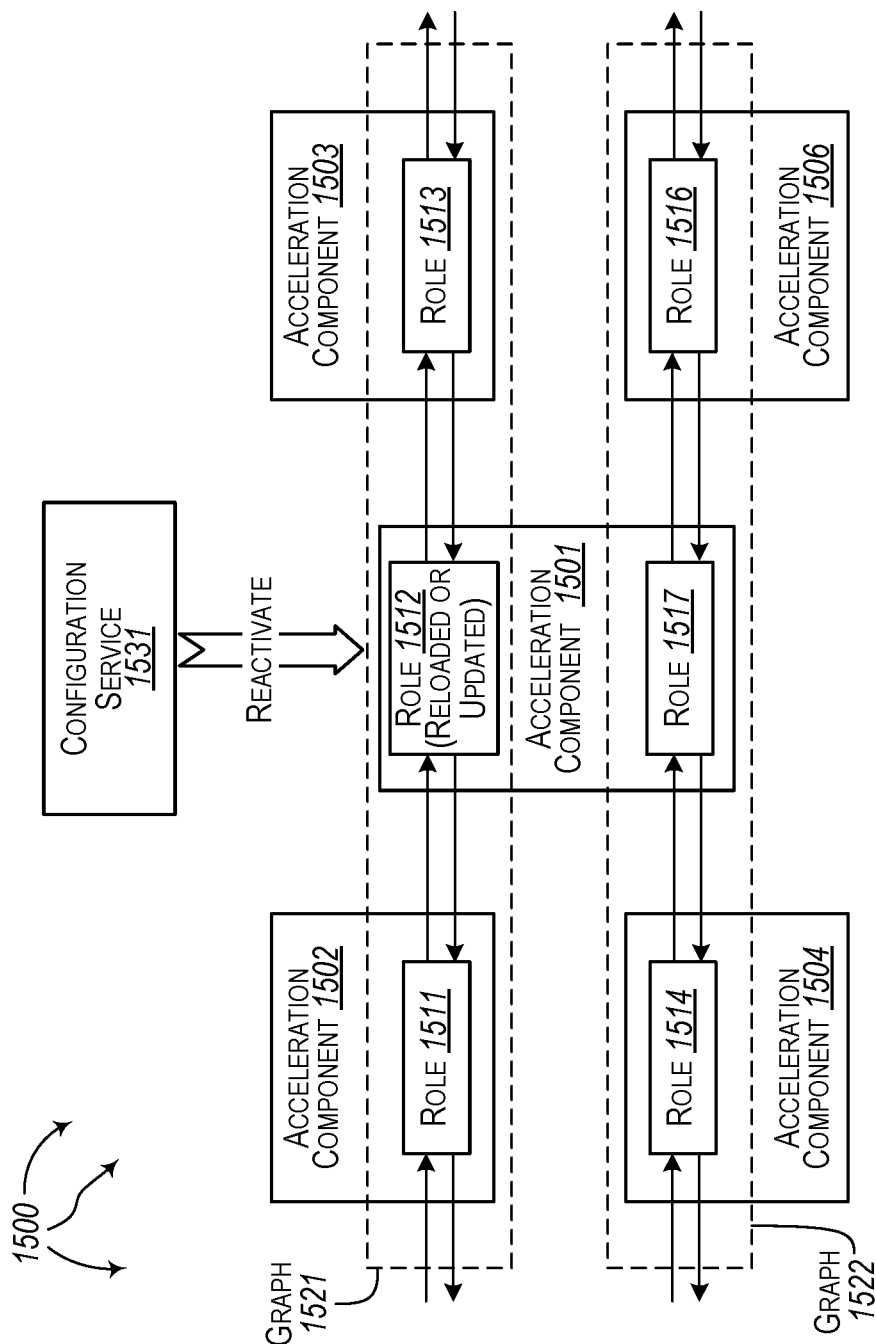

FIGS. 15A-15C illustrate an example architecture 1500 that facilitates partially reconfiguring an acceleration component that has roles included in multiple graphs. As depicted, architecture 1500 includes configuration service 1531 and acceleration components 1501, 1502, 1503, 1504, and 1506. Acceleration components 1501, 1502, 1503, 1504, and 1506 (e.g., FPGAs) can be included in a hardware acceleration plane, such as, hardware acceleration plane 106. The depicted arrangement of acceleration components 1501, 1502, 1503, 1504, and 1506 is logical. The physical proximity of acceleration components 1501, 1502, 1503, 1504, and 1506 to one another can vary (e.g., same server, different servers same rack, different racks, etc.).

Acceleration component 1501 is programmed with roles 1512 and 1517.

Each of acceleration components 1502, 1503, 1504, and 1506 are programmed with a specified role 1511, 1513, 1514, and 1516 respectively. Roles 1511, 1512, and 1513 are linked together to compose graph 1521. Graph 1521 can provide hardware acceleration for a service. Roles 1514, 1517, and 1516 are linked together to compose graph 1522. Graph 1522 can provide hardware acceleration for another different service.

Input and output from roles at (logically) neighboring acceleration components may depend on one another or input and output from other components (e.g., host components or functionality composed from a different group of interoperating acceleration components). For example, input to role 1512 can depend on output from role 1511. Similarly, input to role 1513 can depend on output from role 1512.

Some or all of acceleration components 1501, 1502, 1503, 1504, and 1506 can participate in one-way or two-way communication with (logically) neighboring acceleration components and other components (e.g., host components). Thus, input and output from one acceleration component can depend on input and output from another acceleration component and vice versa. For example, input to role 1511 can depend on output from role 1512 and input to role 1512 can depend on output from role 1513.

A graph can represent a composed grouping of linked roles providing acceleration functionality or a portion thereon. For example, graph 1521 can provide acceleration for part of a document ranking service used to provide search engine results. Graph 1521 can interoperate with other portions of service functionality composed from other groups of interoperating acceleration components and/or provided by one or more host components. For example, for a document ranking service, document feature extraction can be composed from one group of interoperating acceleration components, free form expression calculations can be composed from another group of interoperating acceleration components, and scoring calculations can be composed from a further group of interoperating acceleration components.

Graph 1522 can provide acceleration for another part of the document ranking service or can provide acceleration for some other service (e.g., encryption, compression, computer vision, speech translation, machine learning, etc.).

Configuration service 1531 can monitor the other components depicted in architecture 1500. During monitoring, configuration service 1531 can detect error 1532 in role 1512. Alternately, configuration service 1531 can detect update available message 1537 indicating that there is an update available for role 1512. In response, configuration service 1531 can send halt command 1533 to graph 1521. Halt command 1533 halts operation of role 1512 as well as quiescing graph 1521. Quiescing graph 1521 stops all network traffic flowing into and out of graph 1521. Halt command 1533 also instructs roles 1511 and 1513 to ignore any data coming out of role 1512.

Turning to FIG. 13B, when graph 1521 is quiesced, configuration service 1531 can send reconfigure command 1534 to acceleration component 1501 to cause acceleration component 1501 to reconfigure the functionality of role 1512. Role 1512 can be reconfigured to correct an error or failure, to update, etc. Reconfiguring role 1512 can include reloading a new image (either of role 1512 or an updated role 1512) on acceleration component 1501.

During reconfiguration of role 1512 (e.g., during processing of an image file), other roles at acceleration component 1501 can continue to operate as intended while role 1512 is reconfigured. For example, role 1517 can continue to interoperate and exchange network traffic with other roles in graph 1522 during reconfiguration of role 1512. Thus, an image for one role can be loaded onto acceleration component 1501 without overwriting images for other roles or overwriting a network interface.

When reconfiguration of role 1512 is complete, role 1512 can send configuration complete message 1536 to configuration service 1531. Turning to FIG. 15C, configuration service 1531 can then re-integrate role 1512 (reloaded or updated) into graph 1521 and reactivate graph 1521.

Figure 16:
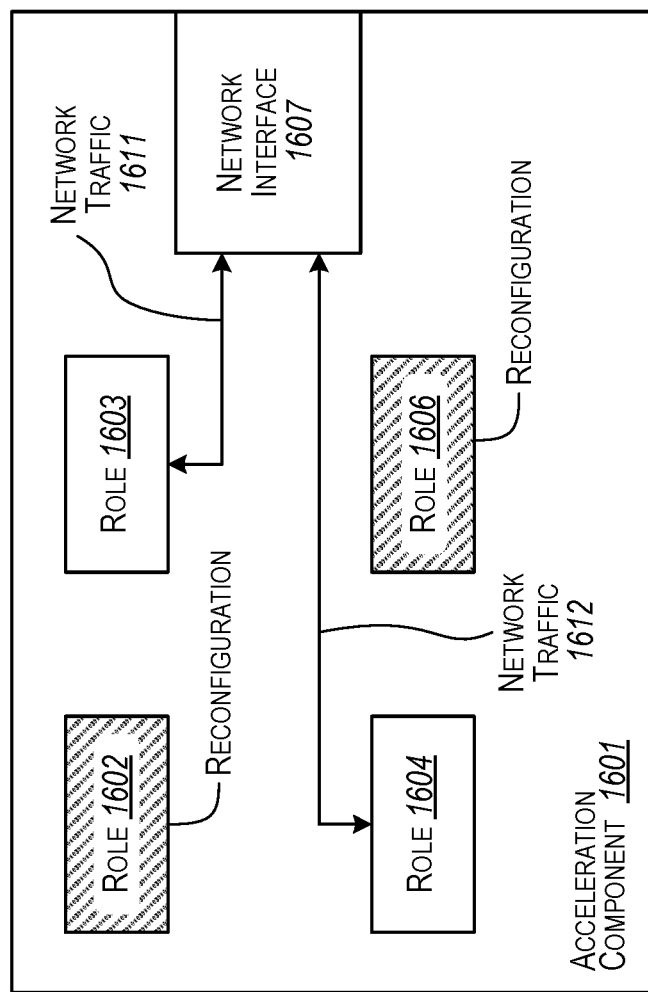
FIG. 16 illustrates an example of partially reconfiguring an acceleration component.

Turning to FIG. 16, FIG. 16 illustrates an example of partially reconfiguring an acceleration component 1601. As depicted, acceleration component 1601 includes roles 1602, 1603, 1604, and 1606 and network interface 1607. Roles 1602 and 1606 are being reconfigured. Roles 1603 and 1604 can exchange network traffic 1611 and 1612 respectively with other components through network interface 1607 while roles 1602 and 1606 are being reconfigured.

In general, the described aspects are advantageous for reconfiguring part of an acceleration component without impacting other parts of the acceleration component. Partial reconfiguration of an acceleration component can also be performed more quickly than full reconfiguration of an acceleration component.

In some aspects, a system includes a hardware acceleration plane, a software plane, and a network infrastructure. The hardware acceleration plane includes a configurable fabric of a plurality of acceleration components (e.g., hardware accelerators, such as, FPGAs). The software plane includes a plurality of host components (e.g., CPUs) running software. The network infrastructure is shared by acceleration components in the hardware acceleration plane and host components in the software plane. The network infrastructure is used by acceleration components to communicate directly with one another. Local links connect acceleration components and host components (e.g., in the same server).

The system also includes one or more computer storage devices having stored thereon computer-executable instructions representing a configuration service, the configuration service is configured to reconfigure acceleration components. Reconfiguring acceleration components includes detecting a reason for reconfiguring an acceleration component (e.g., detecting an error or detecting an available update). The acceleration component is included in and providing functionality to a group of interoperating acceleration components (included in the hardware acceleration plane) that provide acceleration of a service. Functionality at each acceleration component in the group of interoperating acceleration components is composed together in a graph to provide the service acceleration. The acceleration component has other functionality in addition to the provided functionality.

Reconfiguring acceleration components includes halting the provided functionality at the acceleration component. Reconfiguring acceleration components includes partially reconfiguring the acceleration component by writing an image for the provided functionality to the acceleration component (e.g., to address an error or install an update).

Reconfiguring acceleration components includes maintaining other functionality as operational during partially reconfiguring the acceleration component. Maintaining other functionality as operational can include maintaining other roles, maintaining functionality in a soft shell, or maintaining functionality in a shell. Maintained functionality can include functionality that is provided to one or more other groups of acceleration components composed together in graphs to accelerate other services. For example, maintaining functionality can include routing network traffic between the acceleration component and at least one other component during partially reconfiguring the acceleration component. Reconfiguring acceleration components includes activating the provided functionality at the acceleration component after partially reconfiguring the acceleration component is complete.

In another aspect, a method for partially reconfiguring an acceleration component is performed. A reason for changing functionality provided by an acceleration component is detected (e.g., detecting an error or detecting an available update). The provided functionality at the acceleration component is halted. The acceleration component is partially reconfigured by writing an image for the provided functionality to the acceleration component (e.g., to address an error or install an update).

Other functionality is maintained as operational during partially reconfiguring the acceleration component. Maintaining other functionality can include maintaining other roles, maintaining functionality in a soft shell, or maintaining functionality in a shell. Maintained functionality can include functionality that is provided to one or more other groups of acceleration components composed together in graphs to accelerate other services As such, maintaining functionality can include routing network traffic between the acceleration component and at least one other hardware component during partially reconfiguring the acceleration component. The provided functionality is activated at the acceleration component after partially reconfiguring the acceleration component is complete.

In another aspect, a computer program product for use at a computer system includes one or more computer storage devices having stored thereon computer-executable instructions that, in response to execution at a processor, cause the computer system to implement a method for partially reconfiguring an acceleration component (e.g., a hardware accelerator, such as, an FPGA).

The computer program product includes computer-executable instructions that, in response to execution at a processor, cause the computer system to detect a reason for changing the provided functionality (e.g., detecting an error or detecting an available update). The computer program product includes computer-executable instructions that, in response to execution at a processor, cause the computer system to halt the provided functionality at the acceleration component. The computer program product includes computer-executable instructions that, in response to execution at a processor, cause the computer system to partially reconfigure the acceleration component by writing an image for the provided functionality to the acceleration component (e.g., to address an error or install an update).

The computer program product includes computer-executable instructions that, in response to execution at a processor, cause the computer system to maintain other functionality as operational during partially reconfiguring the acceleration component. Maintaining other functionality can include maintaining other roles, maintaining functionality in a soft shell, or maintaining functionality in a shell. Maintained functionality can include functionality that is provided to one or more other groups of acceleration components composed together in graphs to accelerate other services As such, maintaining functionality can include including routing network traffic between the acceleration component and at least one other component during partially reconfiguring the acceleration component. The computer program product includes computer-executable instructions that, in response to execution at a processor, cause the computer system to activate the provided functionality at the acceleration component after partially reconfiguring the acceleration component is complete.

The described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A system comprising:
   a graph comprising a first acceleration component and a second acceleration component, wherein the graph is configured to accelerate a service, wherein each of the first acceleration component and the second acceleration component comprises a plurality of programmable logic blocks and a plurality of reconfigurable interconnects, wherein the first acceleration component is configurable to provide a first role associated with the service and the second acceleration component is configurable to provide a second role associated with the service, and wherein the first acceleration component is coupled to a first network interface operable to allow exchange of network traffic, and wherein the second acceleration component is coupled to a second network interface operable to allow the exchange of the network traffic; and
   one or more computer storage devices having stored thereon computer-executable instructions, when executed by a processor, configured to:
      halt the first role associated with the first acceleration component,
      partially reconfigure the first acceleration component by reprogramming at least a subset of the plurality of programmable logic blocks and a subset of the plurality of reconfigurable interconnects of the first acceleration component,
      maintain each of the first network interface, the second network interface, and the second role associated with the second acceleration component operational during partially reconfiguring the first acceleration component, and
      activate the first role associated with the first acceleration component after partially reconfiguring the first acceleration component is complete.

2. The system of claim 1, wherein the graph provides service acceleration for a service selected from among: document ranking, data encryption, data compression, speech translation, computer vision, or machine learning.

3. The system of claim 1, wherein the second role comprises a downstream role at a downstream neighbor acceleration component of the first acceleration component, and wherein the graph further comprises a third acceleration component configurable to provide a third role associated with the service.

4. The system of claim 3, wherein the third role comprises an upstream role at an upstream neighbor acceleration component of the first acceleration component.

5. The system of claim 4, wherein the computer-executable instructions, when executed by the processor, are further configured to instruct at least one of the second role or the third role to stop receiving data from the first role.

6. The system of claim 1, wherein the first acceleration component comprises at least one field programmable gate array (FPGA), and wherein the computer-executable instructions, when executed by the processor, are further configured to load an image file to the FPGA during partial reconfiguration of the first acceleration component.

7. The system of claim 1, wherein the computer-executable instructions, when executed by the processor, are further configured to, during partially reconfiguring the first acceleration component, maintain each of the first network interface and the second network interface such that each of the first network interface and the second network interface is configured to receive traffic from, or send traffic to, another component associated with the system.

8. A method in a graph comprising a first acceleration component and a second acceleration component, wherein the graph is configured to accelerate a service, wherein each of the first acceleration component and the second acceleration component comprises a plurality of programmable logic blocks and a plurality of reconfigurable interconnects, wherein the first acceleration component is configurable to provide a first role associated with the service and the second acceleration component is configurable to provide a second role associated with the service, and wherein the first acceleration component is coupled to a first network interface operable to allow exchange of network traffic, and wherein the second acceleration component is coupled to a second network interface operable to allow the exchange of the network traffic, the method comprising:
    halting the first role associated with the first acceleration component;
    partially reconfiguring the first acceleration component by reprogramming at least a subset of the plurality of programmable logic blocks and a subset of the plurality of reconfigurable interconnects of the first acceleration component;
    maintaining each of the first network interface, the second network interface, and the second role associated with the second acceleration component operational during partially reconfiguring the first acceleration component; and
    activating the first role associated with the first acceleration component after partially reconfiguring the first acceleration component is complete.

9. The method of claim 8, wherein the graph provides service acceleration for a service selected from among: document ranking, data encryption, data compression, speech translation, computer vision, or machine learning.

10. The method of claim 8, wherein the second role comprises a downstream role at a downstream neighbor acceleration component of the first acceleration component, and wherein the graph further comprises a third acceleration component configurable to provide a third role associated with the service.

11. The method of claim 10, wherein the third role comprises an upstream role at an upstream neighbor acceleration component of the first acceleration component.

12. The method of claim 11 further comprising instructing at least one of the second role or the third role to stop receiving data from the first role.

13. The method of claim 8, wherein the first acceleration component comprising at least one field programmable gate array (FPGA), and wherein the partially reconfiguring the first acceleration component further comprising loading an image file to the at least one FPGA.

14. The method of claim 8 further comprising, during partially reconfiguring the first acceleration component, maintaining each of the first network interface and the second network interface such that each of the first network interface and the second network interface is configured to receive traffic from, or send traffic to, another component associated with the system.

15. A method in a graph comprising a first acceleration component and a second acceleration component, wherein the first acceleration component comprises a first field programmable array (FPGA) and the second acceleration component comprises a second FPGA, wherein the graph is configured to accelerate a service, wherein each of the first acceleration component and the second acceleration component comprises a plurality of programmable logic blocks and a plurality of reconfigurable interconnects, wherein the first acceleration component is configurable to provide a first role associated with the service and the second acceleration component is configurable to provide a second role associated with the service, and wherein the first acceleration component is coupled to a first network interface operable to allow exchange of network traffic, and wherein the second acceleration component is coupled to a second network interface operable to allow the exchange of the network traffic, the method comprising:
    halting the first role associated with the first acceleration component;
    partially reconfiguring the first acceleration component by loading an image file to the first FPGA;
    maintaining each of the first network interface, the second network interface, and the second role associated with the second acceleration component operational during partially reconfiguring the first acceleration component; and
    activating the first role associated with the first acceleration component after partially reconfiguring the first acceleration component is complete.

16. The method of claim 15, wherein the graph provides service acceleration for a service selected from among: document ranking, data encryption, data compression, speech translation, computer vision, or machine learning.

17. The method of claim 15, wherein the second role comprises a downstream role at a downstream neighbor acceleration component of the first acceleration component, and wherein the graph further comprises a third acceleration component configurable to provide a third role associated with the service.

18. The method of claim 17, wherein the third role comprises an upstream role at an upstream neighbor acceleration component of the first acceleration component.

19. The method of claim 18 further comprising instructing at least one of the second role or the third role to stop receiving data from the first role.

20. The method of claim 15 further comprising, during partially reconfiguring the first acceleration component, maintaining each of the first network interface and the second network interface such that each of the first network interface and the second network interface is configured to receive traffic from, or send traffic to, another component associated with the system.

* * * * *